US012713503B2

(12) United States Patent
Asami

(10) Patent No.: US 12,713,503 B2
(45) Date of Patent: Aug. 18, 2026

(54) PULL-OUT HEATING COOKING APPARATUS

(71) Applicant: SHARP KABUSHIKI KAISHA, Sakai City (JP)

(72) Inventor: Shinji Asami, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 1204 days.

(21) Appl. No.: 17/634,719

(22) PCT Filed: Aug. 18, 2020

(86) PCT No.: PCT/JP2020/031126

§ 371 (c)(1),
(2) Date: Feb. 11, 2022

(87) PCT Pub. No.: WO2021/033686

PCT Pub. Date: Feb. 25, 2021

(65) Prior Publication Data

US 2022/0287160 A1 Sep. 8, 2022

(30) Foreign Application Priority Data

Aug. 20, 2019 (JP) ................................ 2019-150380

(51) Int. Cl.
*H05B 6/64* (2006.01)
*F24C 7/02* (2006.01)
(Continued)

(52) U.S. Cl.
CPC ............... *H05B 6/642* (2013.01); *F24C 7/02* (2013.01); *F24C 15/006* (2013.01); *F24C 15/16* (2013.01)

(58) Field of Classification Search
CPC .... H05B 6/642; H05B 6/6414; H05B 6/6485; H05B 6/6458; H05B 6/6473; F24C 7/02;
(Continued)

(56) References Cited

U.S. PATENT DOCUMENTS 5,525,782 A * 6/1996 Yoneno ................ H05B 6/6458
219/401
6,541,746 B2 4/2003 Kim et al.
(Continued)

FOREIGN PATENT DOCUMENTS

CN 104633726 A * 5/2015 ............ F24C 15/006
CN 106322454 A * 1/2017 ............. F24C 15/18
(Continued)

*Primary Examiner* — Steven W Crabb
*Assistant Examiner* — Thao Uyen Tran-Le
(74) *Attorney, Agent, or Firm* — ScienBiziP, P.C.

(57) ABSTRACT

A pull-out heating cooking apparatus (1) includes a heating chamber (10), a drawer body (11), a fan (21), a microwave supply unit (14), an air sending unit (15), and a main body outer case (40). The heating chamber (10) includes a panel (100) provided with a first through hole part (100B) and a second through hole part (100C) are formed. In the heating chamber (10), a first space (S1) and a second space (S2) are formed between an outer surface of the heating chamber (10) and an inner surface of the main body outer case (40). The fan (21) takes in air from the first through hole part (100B) to the first space (S1), and circulates the air to the fan (21) via the first space (S1). The fan (21) blows out the air to the second space (S2) and circulates the air to the second through hole part (100C) via the second space (S2).

12 Claims, 20 Drawing Sheets

(51) Int. Cl.
*F24C 15/00* (2006.01)
*F24C 15/16* (2006.01)

(58) Field of Classification Search
CPC ...... F24C 15/006; F24C 15/16; F24C 15/162; F24C 15/325; F24C 15/00
See application file for complete search history.

(56) References Cited

U.S. PATENT DOCUMENTS

| | | | | |
|---|---|---|---|---|
| 7,193,195 | B2 * | 3/2007 | Lundstrom .......... | H05B 6/6402 219/757 |
| 8,253,084 | B2 | 8/2012 | Toyoda et al. | |
| 8,445,821 | B2 | 5/2013 | Iwamoto | |
| 9,677,770 | B2 * | 6/2017 | Lee ....................... | F24C 15/006 |
| 10,154,549 | B2 | 12/2018 | Nasu et al. | |
| 2001/0004077 | A1 * | 6/2001 | Lee ...................... | H05B 6/6473 219/757 |
| 2002/0063126 | A1 | 5/2002 | Kim et al. | |
| 2004/0129692 | A1 * | 7/2004 | Kim ..................... | H05B 6/6485 219/400 |
| 2005/0236402 | A1 * | 10/2005 | Christiaansen ...... | H05B 6/6485 219/681 |
| 2008/0105133 | A1 * | 5/2008 | McFadden ............ | F24C 15/325 99/324 |
| 2009/0095738 | A1 * | 4/2009 | McNamee ........... | H05B 6/6485 219/679 |
| 2010/0133263 | A1 | 6/2010 | Toyoda et al. | |
| 2010/0200577 | A1 | 8/2010 | Iwamoto | |
| 2011/0139014 | A1 * | 6/2011 | Nishiura ................ | A23B 2/405 99/324 |
| 2012/0187115 | A1 | 7/2012 | Toyoda et al. | |
| 2012/0192725 | A1 | 8/2012 | Toyoda et al. | |
| 2015/0000539 | A1 * | 1/2015 | Tcaciuc ................. | F24C 15/325 99/447 |
| 2015/0241069 | A1 * | 8/2015 | Brant .................... | F24C 15/006 126/21 A |
| 2016/0330800 | A1 * | 11/2016 | Hayashi ................. | H05B 6/645 |
| 2017/0086264 | A1 * | 3/2017 | Zhou .................... | H05B 6/6423 |
| 2017/0171921 | A1 * | 6/2017 | Nasu .................... | H05B 6/6414 |

FOREIGN PATENT DOCUMENTS

| | | | | | |
|---|---|---|---|---|---|
| CN | 104633726 | B | | 5/2017 | |
| CN | 110089950 | A | * | 8/2019 | .......... A47J 37/0623 |
| JP | H05-005529 | A | | 1/1993 | |
| JP | 2002-206748 | A | | 7/2002 | |
| JP | 2009-008298 | A | | 1/2009 | |
| JP | 2010-133634 | A | | 6/2010 | |
| JP | 2010-181103 | A | | 8/2010 | |
| JP | 2016-056968 | A | | 4/2016 | |

* cited by examiner

PULL-OUT HEATING COOKING APPARATUS

TECHNICAL FIELD

The present invention relates to a pull-out heating cooking apparatus.

BACKGROUND ART

A pull-out heating cooking apparatus is known. The pull-out heating cooking apparatus includes a heating chamber and a drawer body. The heating chamber includes a heating cooking chamber. The drawer body is integrally formed with an opening/closing door. The drawer body is installed in the heating cooking chamber so as to be capable of being drawn out. Such a pull-out heating cooking apparatus is incorporated into a cabinet of a built-in kitchen.

PTL 1 discloses a pull-out heating cooking apparatus. Heating functions of the pull-out heating cooking apparatus disclosed in PTL 1 include a microwave heating function and a rapid hot air heating function. The microwave heating function is a function of applying microwaves toward an object to be heated. The rapid hot air heating function is a function of rapidly blowing out hot air toward an object to be heated.

CITATION LIST

Patent Literature

PTL 1: JP 2010-133634 A

SUMMARY OF INVENTION

Technical Problem

However, PTL 1 does not disclose a configuration for cooling an outer surface of a heating chamber. Thus, in the pull-out heating cooking apparatus disclosed in PTL 1, when the rapid hot air heating function is used, the outer surface of the heating chamber may increase in temperature along with the increase in temperature in the heating chamber. As a result, the temperature around the outer surface of the heating chamber may be increased. Electrical components, functional components, structural components, and a main body outer case are disposed around the outer surface of the heating chamber.

In light of the problems described above, the present invention has an object to provide a pull-out heating cooking apparatus capable of suppressing an increase in temperature around an outer surface of a heating chamber.

Solution to Problem

A first pull-out heating cooking apparatus of the present invention includes a heating chamber, a drawer body, a fan, a microwave supply unit, an air sending unit, and a main body outer case. The heating chamber has a heating cooking chamber formed inside. The drawer body is accommodated in the heating cooking chamber so as to be capable of being drawn out. The microwave supply unit supplies microwaves into the heating cooking chamber. The air sending unit supplies hot air into the heating cooking chamber. The main body outer case accommodates the heating chamber, the fan, the microwave supply unit, and the air sending unit. The heating chamber includes a panel. A first through hole part and a second through hole part are formed in the panel. The panel is disposed on a front face side of the heating chamber. In the heating chamber, a first space and a second space are formed between the outer surface of the heating chamber and an inner surface of the main body outer case. The first space guides air taken in from the first through hole part to the fan. The second space guides air emitted from the fan to the second through hole part along the outer surface of the heating chamber. The fan takes in air from the first through hole part to the first space, and circulates the air to the fan via the first space. The fan blows out the air to the second space, and circulates the air to the second through hole part via the second space.

A second pull-out heating cooking apparatus of the present invention is built-in in a cabinet. The pull-out heating cooking apparatus includes a heating chamber, a drawer body, a fan, a microwave supply unit, and an air sending unit. The heating chamber has a heating cooking chamber formed inside. The drawer body is accommodated in the heating cooking chamber so as to be capable of being drawn out. The microwave supply unit supplies microwaves into the heating cooking chamber. The air sending unit supplies hot air into the heating cooking chamber. The heating chamber includes a panel. A first through hole part and a second through hole part are formed in the panel. The panel is disposed on a front face side of the heating chamber. In the heating chamber, a first space and a second space are formed between the outer surface of the heating chamber and the cabinet when the pull-out heating cooking apparatus is built-in in the cabinet. The first space guides air taken in from the first through hole part to the fan. The second space guides air emitted from the fan to the second through hole part along the outer surface of the heating chamber. The fan takes in air from the first through hole part to the first space, and circulates the air to the fan via the first space. The fan blows out the air to the second space, and circulates the air to the second through hole part via the second space.

Advantageous Effects of Invention

According to a pull-out heating cooking apparatus of the present invention, an increase in temperature around an outer surface of a heating chamber can be suppressed.

BRIEF DESCRIPTION OF DRAWINGS

FIG. 20 is a diagram illustrating an appearance of a cabinet in which the pull-out heating cooking apparatus according to the first embodiment of the present invention is built-in.

DESCRIPTION OF EMBODIMENTS

Figure 1:
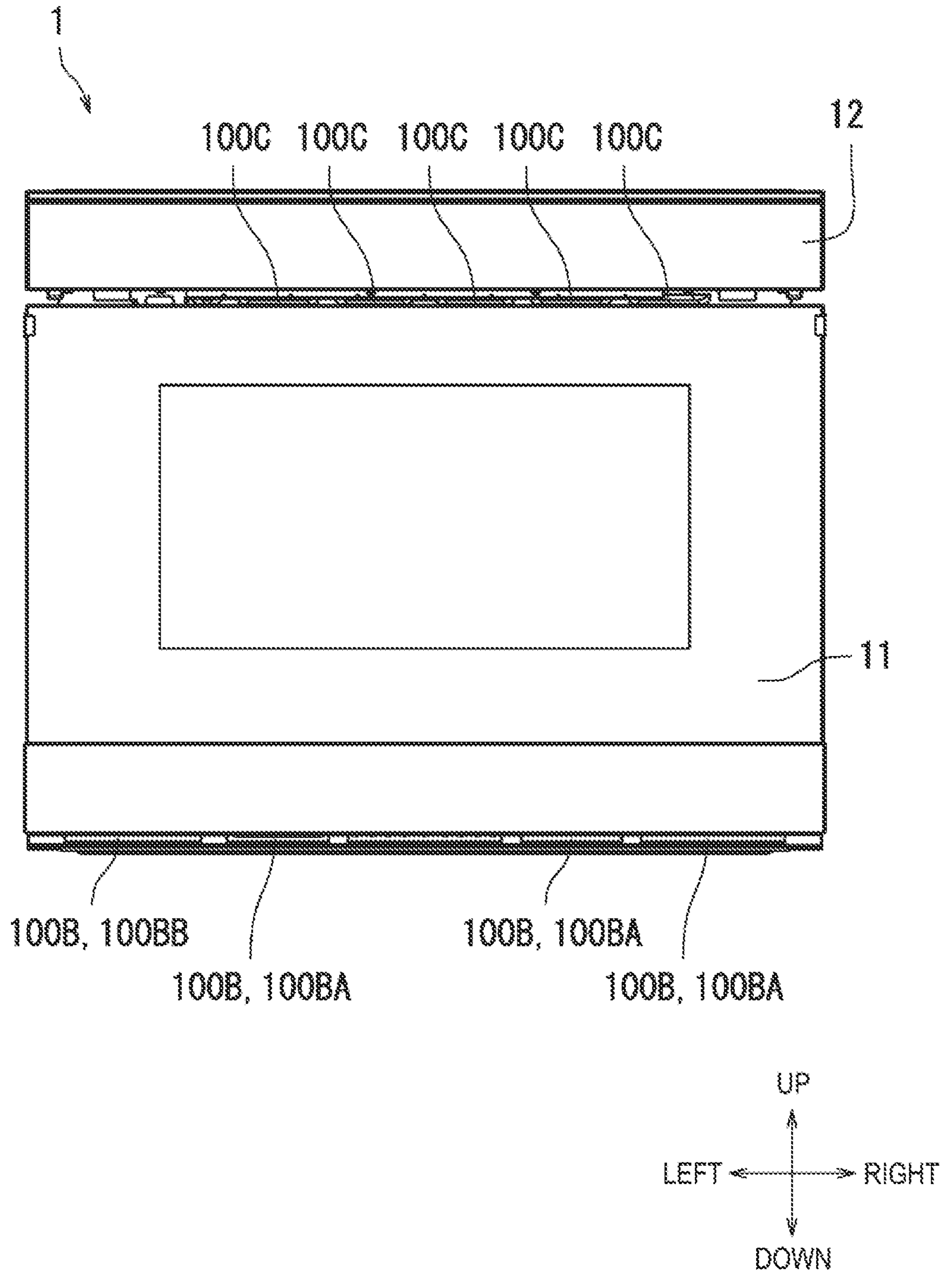
FIG. 1 is a front view of a pull-out heating cooking apparatus according to a first embodiment of the present invention.

Hereinafter, an embodiment of a pull-out heating cooking apparatus according to the present invention will be described with reference to the drawings. In the drawings, the same or equivalent components are denoted by the same reference signs and description thereof will not be repeated.

Figure 2:
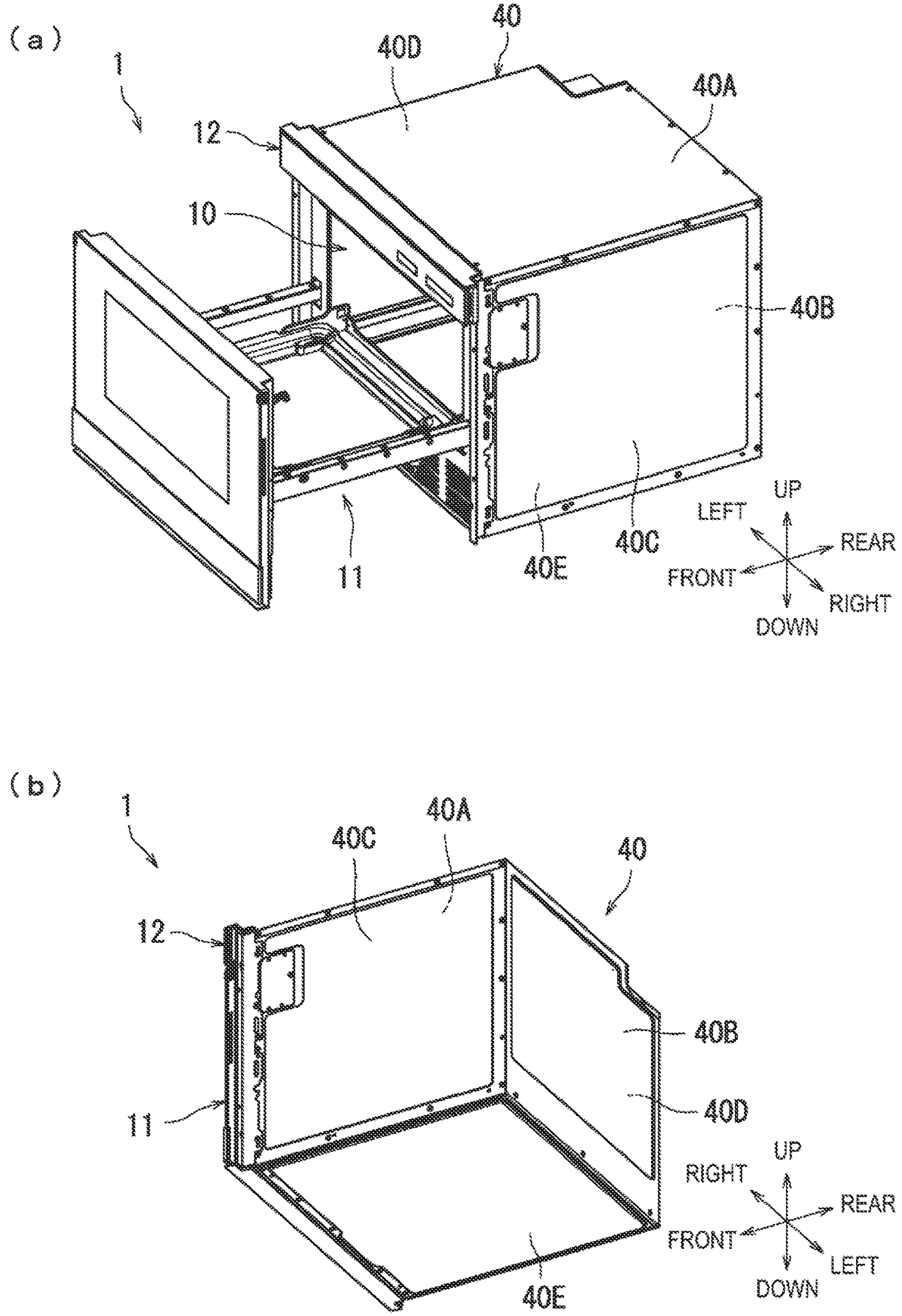
FIGS. 2(*a*) and (*b*) are a perspective view illustrating the pull-out heating cooking apparatus according to the first embodiment of the present invention.
Figure 3:
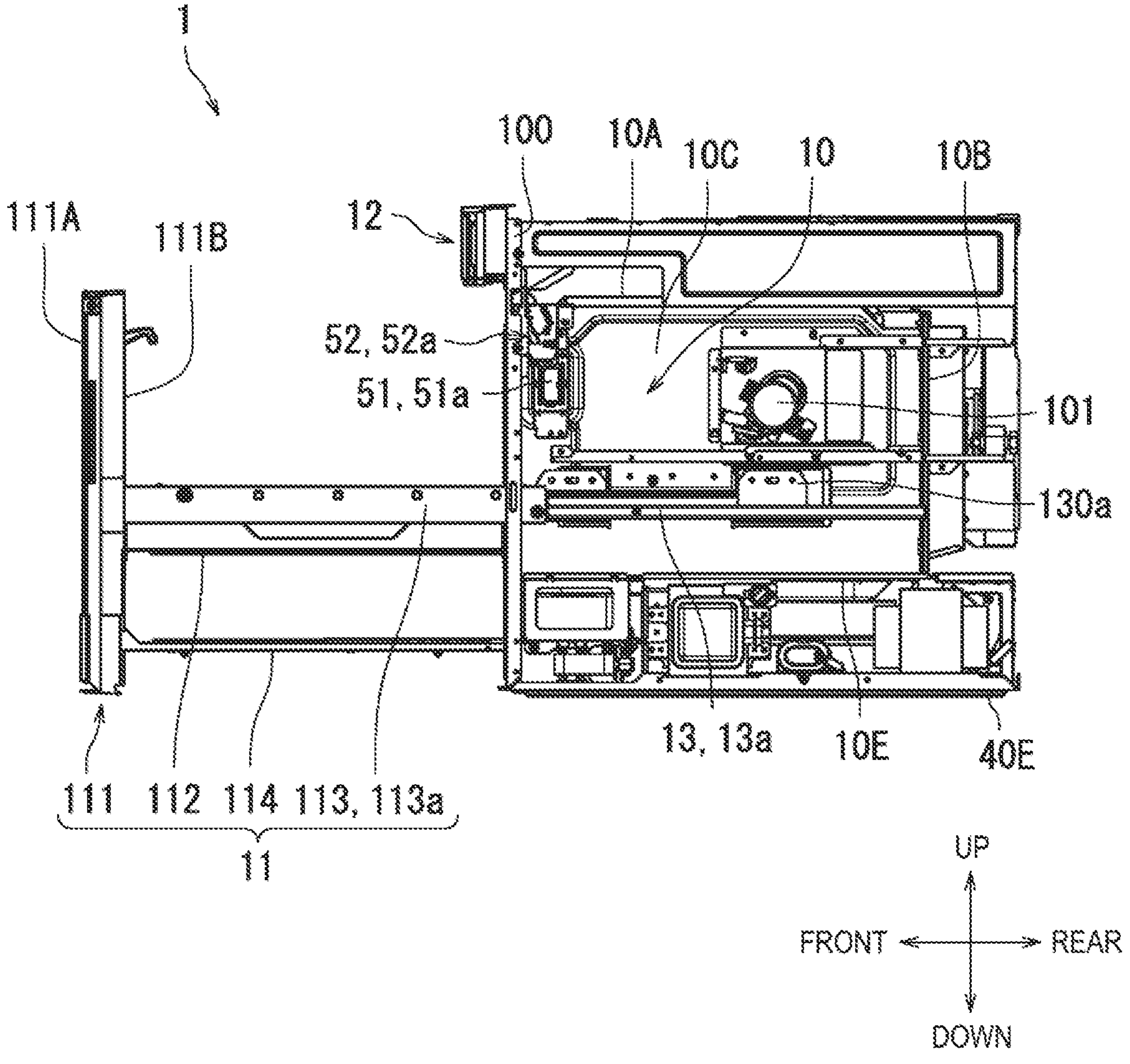
FIG. 3 is a diagram illustrating a right side surface of the pull-out heating cooking apparatus according to the first embodiment of the present invention.
Figure 4:
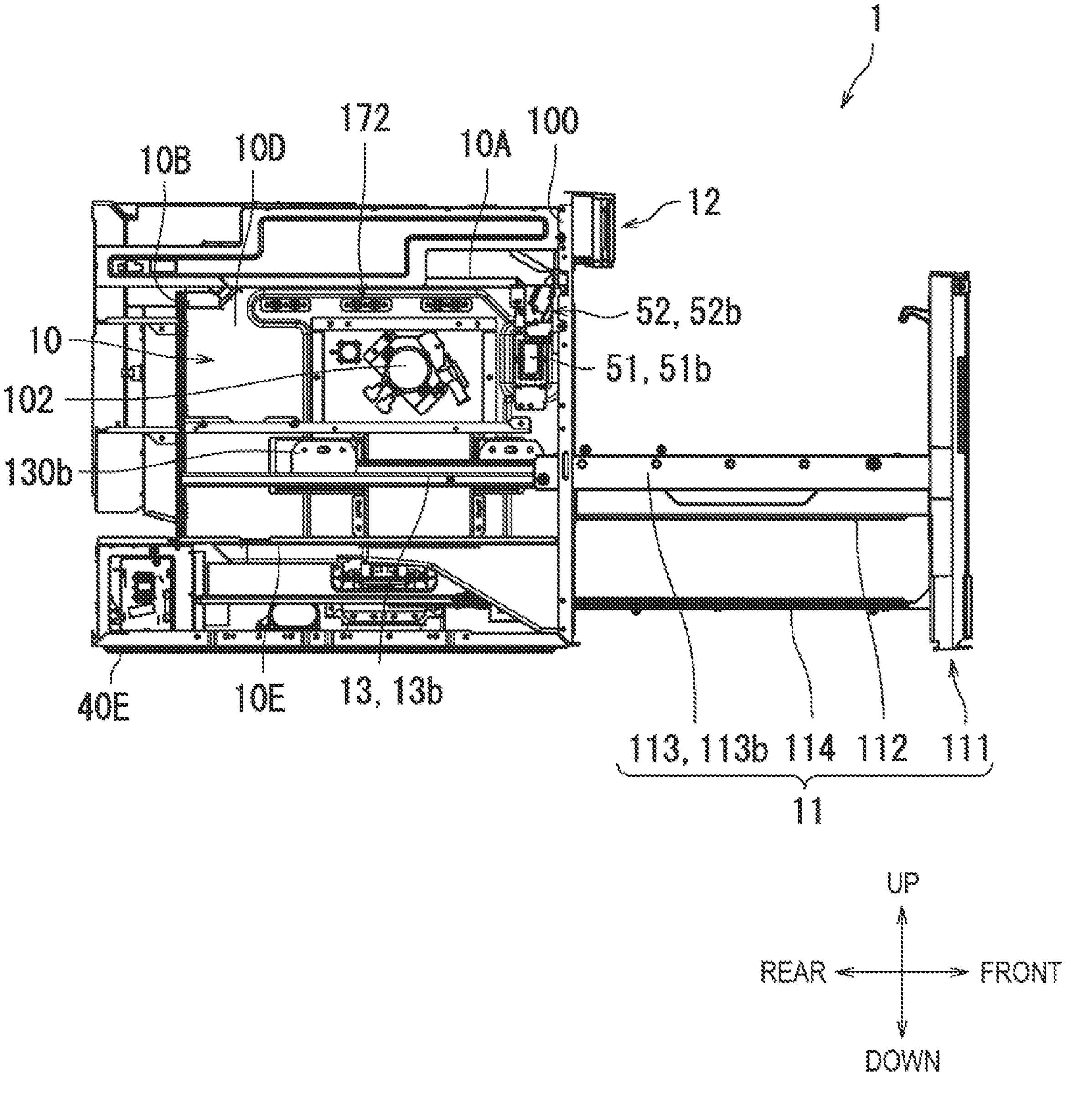
FIG. 4 is a diagram illustrating a left side surface of the pull-out heating cooking apparatus according to the first embodiment of the present invention.
Figure 5:
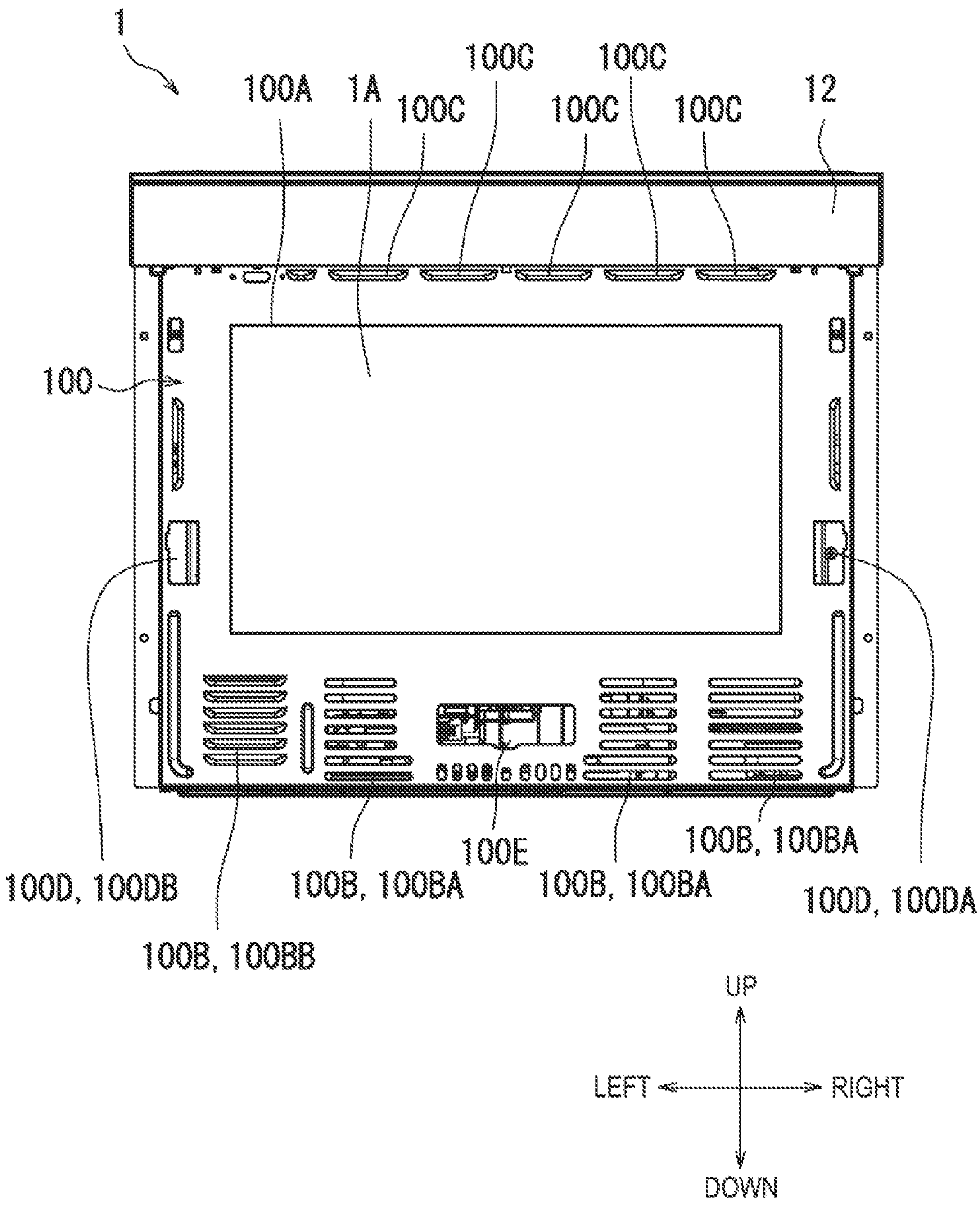
FIG. 5 is a front view of the pull-out heating cooking apparatus according to the first embodiment of the present invention.

A pull-out heating cooking apparatus 1 according to the first embodiment will be described with reference to FIG. 1 to FIG. 5. FIG. 1 is a front view of the pull-out heating cooking apparatus 1 according to the first embodiment. FIG. 2(*a*) and FIG. 2(*b*) are each a perspective view of the pull-out heating cooking apparatus 1 according to the first embodiment. More specifically, FIG. 2(*a*) illustrates the pull-out heating cooking apparatus 1 as viewed diagonally from an upper right side in front. FIG. 2(*b*) illustrates the pull-out heating cooking apparatus 1 as viewed diagonally from a lower right side from behind. FIG. 3 is a diagram illustrating the right side surface of the pull-out heating cooking apparatus 1 according to the first embodiment. More specifically, FIG. 3 illustrates a right side surface of the pull-out heating cooking apparatus 1 in a state in which the main body outer case 40 is removed. FIG. 4 is a diagram illustrating a left side surface of the pull-out heating cooking apparatus 1 according to the first embodiment. More specifically, FIG. 4 illustrates the left side surface of the pull-out heating cooking apparatus 1 in a state in which the main body outer case 40 is removed. FIG. 5 is a front view of the pull-out heating cooking apparatus 1 according to the first embodiment. More specifically, FIG. 5 illustrates the pull-out heating cooking apparatus 1 in a state in which a drawer body 11 is removed.

The pull-out heating cooking apparatus 1 heats and cooks an object to be heated. As illustrated in FIG. 1, the pull-out heating cooking apparatus 1 includes the drawer body 11 and an operation panel 12. As illustrated in FIG. 2(*a*), the pull-out heating cooking apparatus 1 further includes a heating chamber 10 and the main body outer case 40.

In the first embodiment, a side on which the operation panel 12 of the pull-out heating cooking apparatus 1 is disposed is defined as a front side of the pull-out heating cooking apparatus 1, and a side opposite to the front side is defined as a rear side of the pull-out heating cooking apparatus 1. A right side of the pull-out heating cooking apparatus 1 when the pull-out heating cooking apparatus 1 is viewed from the front side is defined as a right side, and a side opposite to the right side is defined as a left side of the pull-out heating cooking apparatus 1. In a direction orthogonal to a front-rear direction and a left-right direction of the pull-out heating cooking apparatus 1, a side on which the operation panel 12 is disposed is defined as an upper side of the pull-out heating cooking apparatus 1, and a side opposite to the upper side is defined as a lower side of the pull-out heating cooking apparatus 1. Note that these orientations do not limit the orientation of the pull-out heating cooking apparatus according to the present invention when in use.

Next, with reference to FIG. 2(*a*) to FIG. 5, the heating chamber 10 will be described. As illustrated in FIG. 2(*a*), the heating chamber 10 is a box-like member. As illustrated in FIG. 3 and FIG. 4, the heating chamber 10 includes an upper inner wall 10A, a rear inner wall 10B, a right inner wall 10C (see FIG. 3), a left inner wall 10D (see FIG. 4), and a bottom inner wall 10E. As illustrated in FIG. 5, the heating chamber 10 has a heating cooking chamber 1A therein. The heating cooking chamber 1A indicates a space for accommodating an object to be heated. A surface opposite to a surface on the heating cooking chamber 1A side of each of the upper inner wall 10A, the rear inner wall 10B, the right inner wall 10C, the left inner wall 10D, and the bottom inner wall 10E of the heating chamber 10 forms an outer surface of the heating chamber 10. A surface opposite to a surface on the heating cooking chamber 1A side of the upper inner wall 10A of the heating chamber 10 forms an upper surface of the heating chamber 10. A surface opposite to a surface on the heating cooking chamber 1A side of the rear inner wall 10B of the heating chamber 10 forms a rear surface of the heating chamber 10. Surfaces opposite to the surfaces on the heating cooking chamber 1A side of the right inner wall 10C and the left inner wall 10D of the heating chamber 10 form side surfaces of the heating chamber 10.

In the first embodiment, the pull-out heating cooking apparatus 1 includes, as heating cooking modes, a microwave heating mode, a first hot air circulation heating mode, a second hot air circulation heating mode, and a grill heating mode. The microwave heating mode is mainly a mode in which the object to be heated is heated and cooked through radiation of microwaves into the heating cooking chamber 1A. The first hot air circulation heating mode is mainly a mode in which the object to be heated is heated and cooked by circulating a first hot air H1 in the heating cooking chamber 1A to make the temperature in the heating cooking chamber 1A uniform. The second hot air circulation heating mode mainly includes a first mode and a second mode. The first mode is a mode in which the object to be heated is heated and cooked by directly blowing a second hot air H2 onto an upper surface of the object to be heated. The second mode is a mode in which the inside of the heating cooking chamber 1A is preheated in a short period of time by circulating the second hot air H2 in the heating cooking chamber 1A. The grill heating mode is mainly a mode in which the object to be heated is heated and cooked by exposing the object to be heated to radiant heat.

As illustrated in FIG. 3 to FIG. 5, the heating chamber 10 includes a panel 100 on the front face side. As illustrated in FIG. 5, the panel 100 is a rectangle member having a plate-like shape. The panel 100 includes, an opening part 100A, a plurality of first through hole parts 100B, a plurality of second through hole parts 100C a pair of third through hole parts 100D, and a fourth through hole part 100E. The pair of third through hole parts 100D includes a right through hole part 100DA and a left through hole part 100DB. Hereinafter, the second through hole parts 100C are referred to as "exhaust hole parts 100C". The opening part 100A has a rectangular shape. The opening part 100A communicates with the heating cooking chamber 1A.

The opening part 100A is formed near the center portion of the panel 100. The plurality of first through hole parts 100B, the plurality of exhaust hole parts 100C, the pair of third through hole parts 100D, and the fourth through hole part 100E are formed around the opening part 100A. Specifically, the plurality of first through hole parts 100B are formed at a position closer to a lower side that the opening part 100A of the panel 100. The plurality of first through hole parts 100B form four rows along an up-down direction in a left-right direction. Two of the four rows of the plurality of first through hole parts 100B are formed in a right portion of the panel 100. The right portion of the panel 100 indicates a portion closer to a right side than the fourth through hole part 100E of the panel 100. The remaining two rows of the four rows of the plurality of first through hole parts 100B are formed in a left portion of the panel 100. The left portion of the panel 100 indicates a portion closer to a left side than the fourth through hole part 100E of the panel 100. The plurality of exhaust hole parts 100C are formed at a position closer to an upper side than the opening part 100A of the panel 100. Specifically, the plurality of exhaust hole parts 100C are formed from the right portion to the left portion. In other words, the plurality of first through hole parts 100B and the plurality of exhaust hole parts 100C are formed in the panel 100 so as to sandwich the opening part 100A therebetween. The right through hole part 100DA is formed at a position closer to a right side than the opening part 100A. The right through hole part 100DA is also formed near the center portion in the up-down direction of the panel 100. The left through hole part 100DB is formed closer to the left side than the opening part 100A. The left through hole part 100DB is formed at a position near the center portion in the up-down direction of the panel 100. The fourth through hole part 100E is formed at a position closer to the lower side than the opening part 100A of the panel 100. Specifically, the fourth through hole part 100E is formed between the right portion and the left portion of the panel 100. Three rows out of the four rows constituted of the plurality of first through hole parts 100B except the row located on the leftmost side may be referred to as "air intake hole parts 100BA". A row located on the leftmost side out of the four rows constituted of the plurality of first through hole parts 100B may be referred to as an "exhaust hole part 100BB".

As illustrated in FIG. 3 and FIG. 4, the operation panel 12 is disposed at a position closer to a front side than the panel 100. The drawer body 11 is disposed so as to be drawn out in front of the panel 100. As illustrated in FIG. 1, the operation panel 12 is located on the upper side of the plurality of exhaust hole parts 100C. The drawer body 11 is located on the lower side of the plurality of exhaust hole parts 100C. In other words, the plurality of exhaust hole parts 100C are located between the drawer body 11 and the operation panel 12 in the up-down direction.

The operation panel 12 includes an operating unit and a display unit. The operating unit receives an operation from a user. The display unit displays various pieces of information.

With reference to FIG. 1 to FIG. 5, the drawer body 11 will be described. The drawer body 11 is accommodated in the heating cooking chamber 1A so as to be capable of being drawn out. As illustrated in FIG. 3 and FIG. 4, the drawer body 11 includes a door part 111 and a placement part 112. The drawer body 11 is supported by a pair of left and right slide members 113 and a support member 114.

The door part 111 is a substantially rectangular plate-like member. The door part 111 includes a front face 111A and a rear surface 111B. The placement part 112 is attached to the rear surface 111B of the door part 111. When the drawer body 11 is drawn out from the heating cooking chamber 1A, the placement part 112 passes through the opening part 100A. The pair of left and right slide members 113 includes a right slide member 113*a* (see FIG. 3) disposed on the right side and a left slide member 113*b* (see FIG. 4) disposed on the left side. The right slide member 113*a* and the left slide member 113*b* face each other in the left-right direction. The right slide member 113*a* and the left slide member 113*b* are attached to the door part 111. The right slide member 113*a* passes through the right through hole part 100DA (see FIG. 5) of the panel 100. The left slide member 113*b* passes through the left through hole part 100DB (see FIG. 5) of the panel 100. The support member 114 is attached near the center portion of the rear surface 111B of the door part 111 in the left-right direction and closer to a lower side than the placement part 112. The support member 114 passes through the fourth through hole part 100E (see FIG. 5) of the panel 100.

The placement part 112 is accommodated in the heating cooking chamber 1A in a state in which the drawer body 11 is drawn into the heating cooking chamber 1A. Hereinafter, the state in which the drawer body 11 is drawn into the heating cooking chamber 1A will be referred to as a "closed state". The door part 111 closes the opening part 100A in the closed state. The pair of left and right slide members 113 and the support member 114 are not accommodated in the heating cooking chamber 1A in the closed state. The placement part 112 is drawn out to the outside from the inside of the heating cooking chamber 1A in a state in which the drawer body 11 is drawn out from the inside of the heating cooking chamber 1A. Hereinafter, a state in which the drawer body 11 is drawn out from the heating cooking chamber 1A will be referred to as an "opened state". The door part 111 opens the opening part 100A in the opened state.

The door part 111 is capable of opening and closing the opening part 100A. The object to be heated can be placed on the placement part 112. Each of the pair of left and right slide members 113 is a tube-like member having a front-rear direction as a longitudinal direction. Each of the pair of left and right slide members 113 has a hollow portion therein. The support member 114 is a plate-like member having a front-rear direction as a longitudinal direction. The support member 114 includes a rack part. The rack portion includes a plurality of teeth. The main body outer case 40 includes a bottom outer wall 40E (see FIG. 2(*b*)). The pull-out heating cooking apparatus 1 includes a space between the bottom inner wall 10E of the heating chamber 10 and the bottom outer wall 40E of the main body outer case 40. The heating chamber 10 includes a drive mechanism 30 to be described later with reference to FIG. 15. The drive mechanism 30 is accommodated in a space formed between the bottom inner wall 10E and the bottom outer wall 40E. By being engaged with the rack part of the support member 114, the drive mechanism 30 causes the drawer body 11 to be in the opened state or the closed state.

The main body outer case 40 will be described with reference to FIG. 2(*a*) and FIG. 2(*b*). The main body outer case 40 is a housing. Specifically, the main body outer case 40 accommodates a microwave supply unit 14, a first air sending unit 15, and a second air sending unit 16, described below with reference to FIG. 6 to FIG. 8, and a cooling fan 21, and the like, described below with reference to FIG. 8 and FIG. 11. As illustrated in FIG. 2(*a*) and FIG. 2(*b*), the pull-out heating cooking apparatus 1 includes an upper outer wall 40A, a rear outer wall 40B, a right outer wall 40C, a left outer wall 40D, and a bottom outer wall 40E. The main body outer case 40 forms the upper outer wall 40A, the rear outer wall 40B, the right outer wall 40C, and the left outer wall 40D of the pull-out heating cooking apparatus 1.

Figure 6:
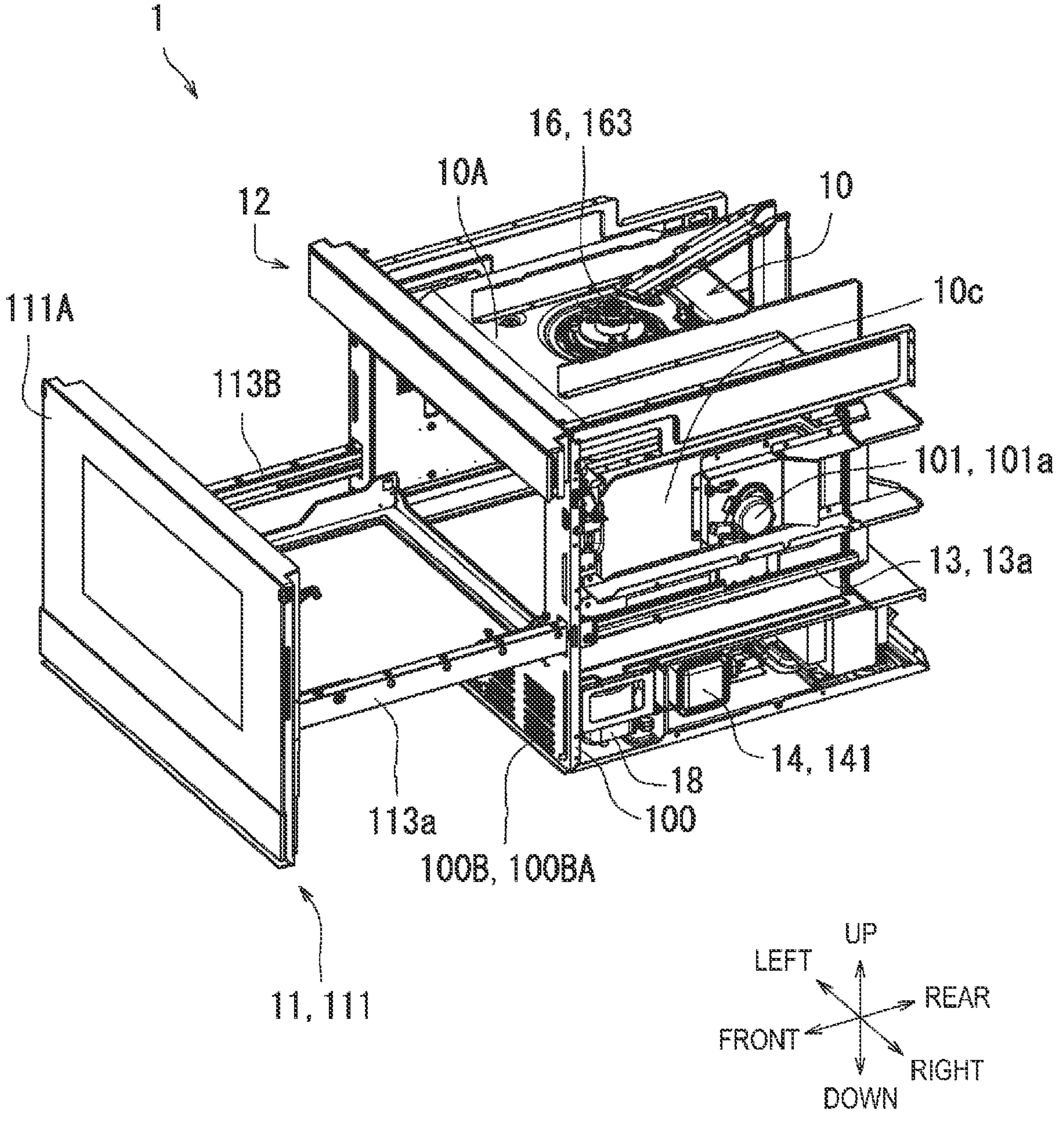
FIG. 6 is a perspective view illustrating the pull-out heating cooking apparatus according to the first embodiment of the present invention.
Figure 7:
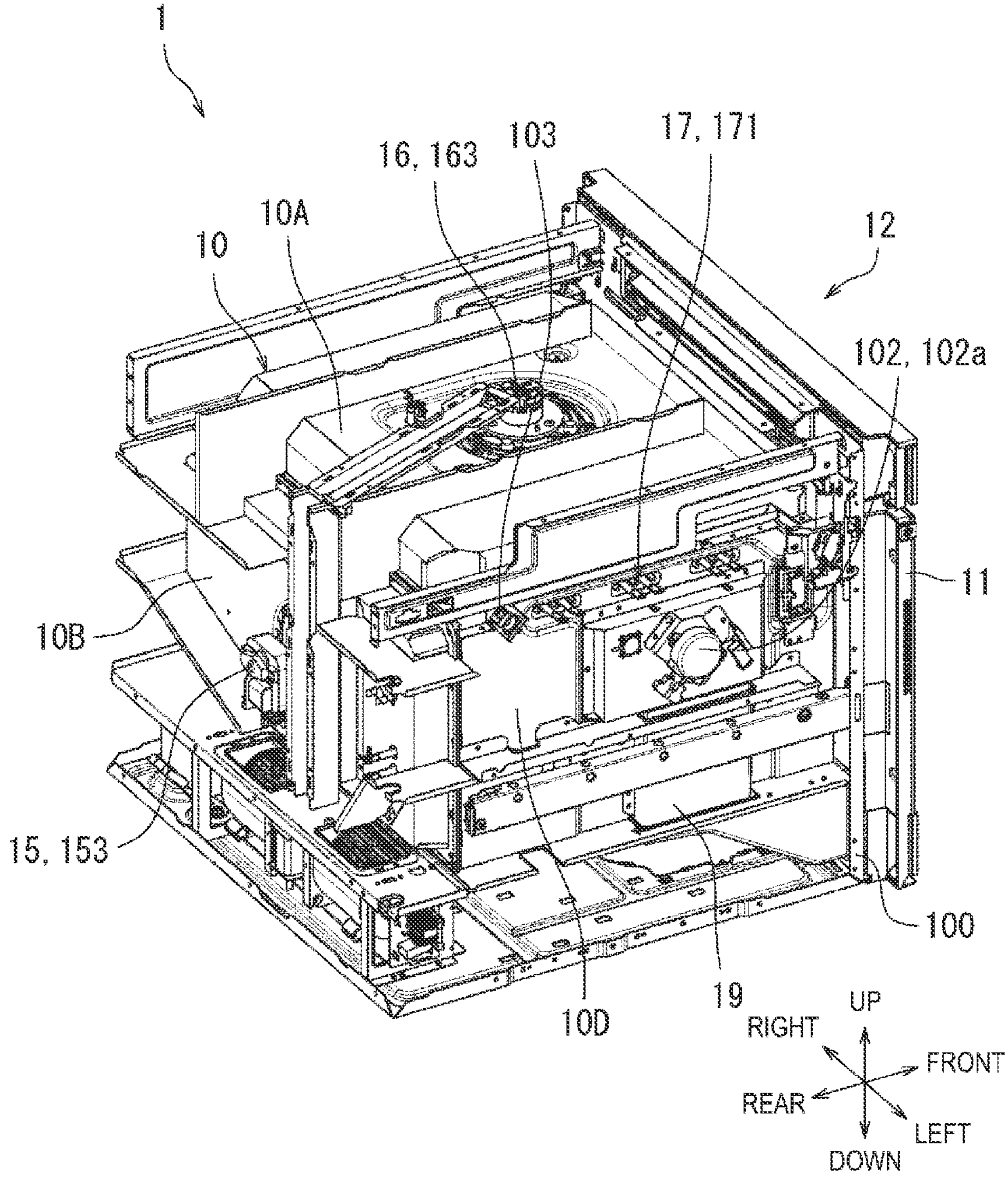
FIG. 7 is a perspective view illustrating the pull-out heating cooking apparatus according to the first embodiment of the present invention.
Figure 8:
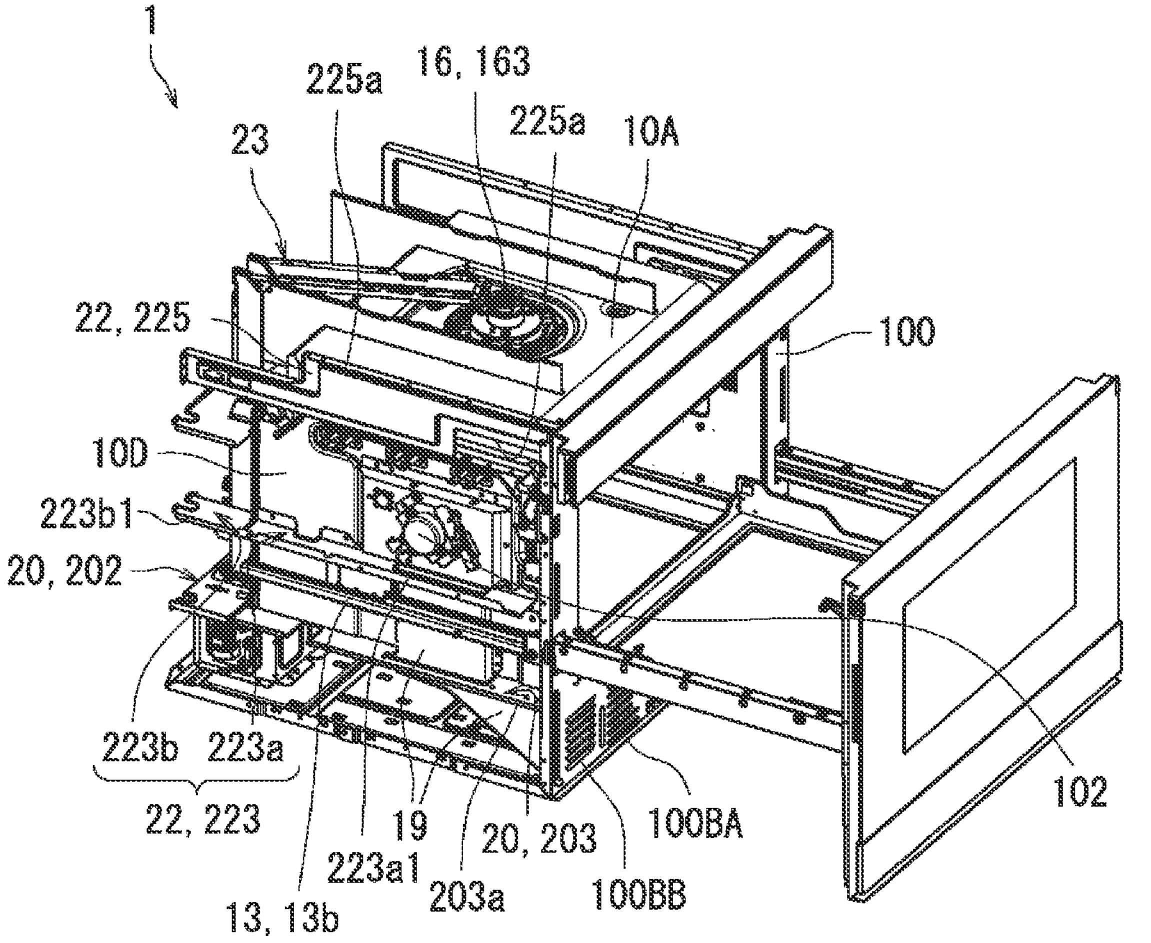
FIG. 8 is a perspective view illustrating the pull-out heating cooking apparatus according to the first embodiment of the present invention.
Figure 9:
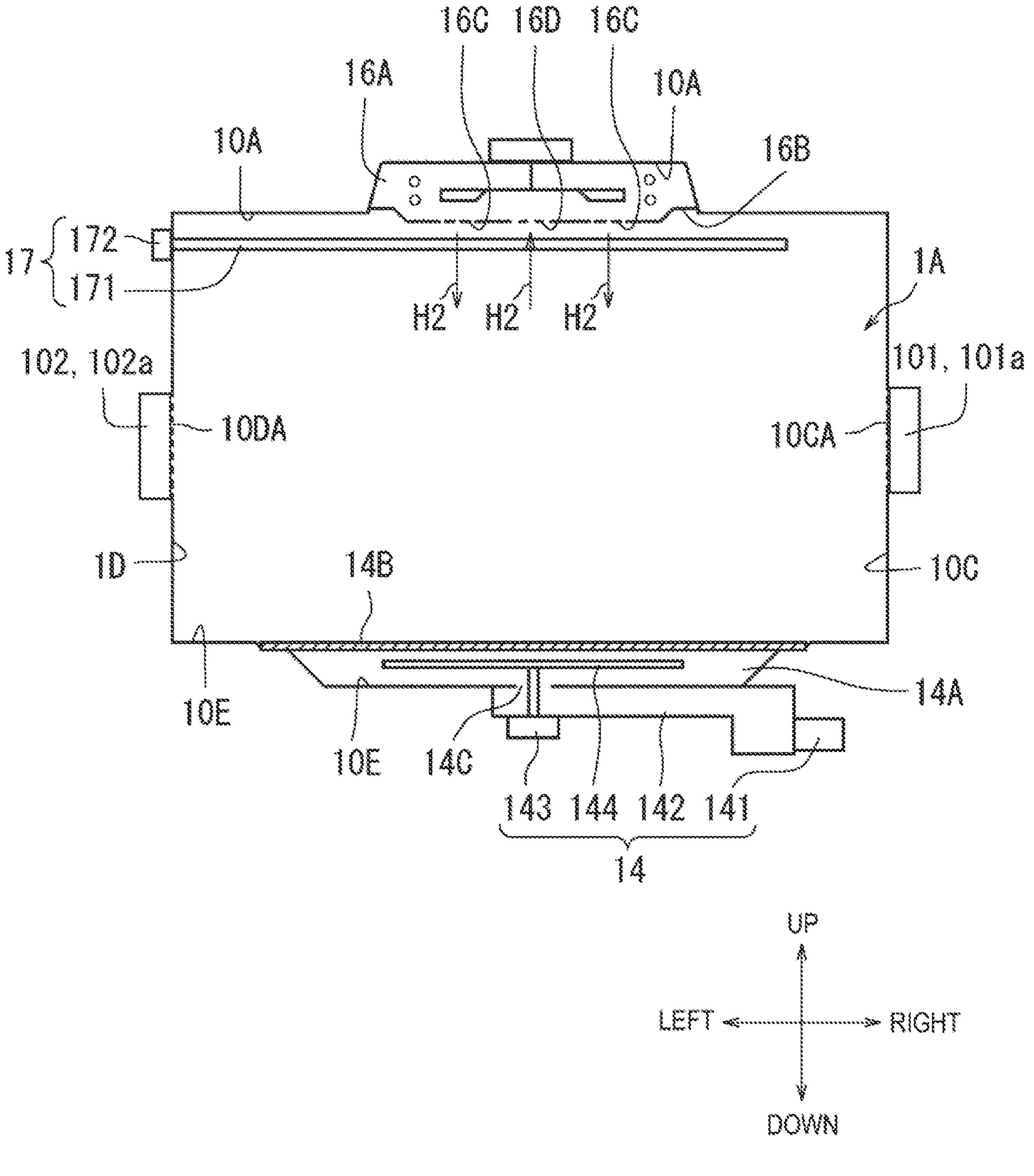
FIG. 9 is a diagram illustrating a schematic cross section of a heating chamber according to the first embodiment of the present invention.
Figure 10:
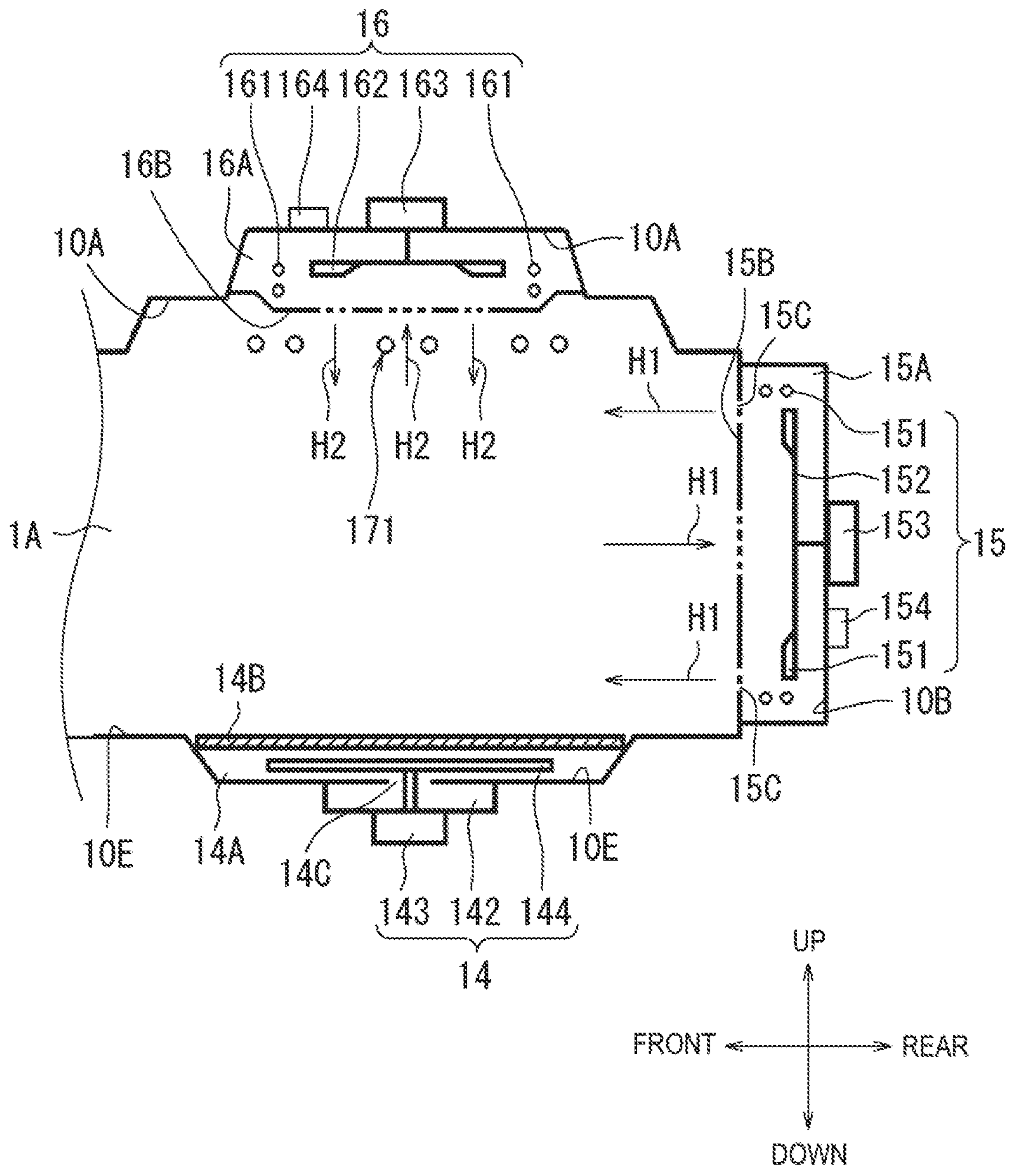
FIG. 10 is a diagram illustrating a schematic cross section of the heating chamber according to the first embodiment of the present invention.

Next, the heating chamber 10 and the door part 111 according to the first embodiment will be further described with reference to FIG. 1 to FIG. 10. FIG. 6 to FIG. 8 are perspective views of the pull-out heating cooking apparatus 1 according to the first embodiment. FIG. 9 and FIG. 10 are diagrams illustrating schematic cross sections of the heating chamber 10 according to the first embodiment. More specifically, FIG. 6 illustrates the pull-out heating cooking apparatus 1 in a state in which the main body outer case 40 is removed, as viewed diagonally from an upper right side in front. FIG. 7 illustrates the pull-out heating cooking apparatus 1 in a state in which the main body outer case 40 is removed, as viewed diagonally from an upper left side from behind. FIG. 8 illustrates the pull-out heating cooking apparatus 1 in a state in which the main body outer case 40 is removed, as viewed diagonally from an upper left side in front. FIG. 9 illustrates a cross section of the heating chamber 10 taken along a plane orthogonal to the front-rear direction. FIG. 10 illustrates a cross section of the heating chamber 10 taken along a plane orthogonal to the left-right direction.

As illustrated in FIG. 6 to FIG. 8, the heating chamber 10 further includes an air supply damper 101 (see FIG. 6), an exhaust damper 102 (see FIG. 7 and FIG. 8), and a humidity sensor 103 (see FIG. 7). The air supply damper 101 is disposed in an air supply duct. The exhaust damper 102 is disposed in an exhaust duct. The humidity sensor 103 is disposed on the exhaust duct. The air supply damper 101 and the exhaust damper 102 are operated in the opened state or the closed state in accordance with each heating cooking mode in order to ensure the performance of the pull-out heating cooking apparatus 1 during heated and cooked. The humidity sensor 103 detects mainly the amount of steam contained in the air emitted from the exhaust hole part 10DA of the heating chamber 10 described below with reference to FIG. 9. As illustrated in FIG. 6, the air supply damper 101 is located on the right inner wall 10C of the heating chamber 10. As illustrated in FIG. 7 and FIG. 8, the exhaust damper 102 is located on the left inner wall 10D of the heating chamber 10.

As illustrated in FIG. 9, the heating chamber 10 includes an air supply hole part 10CA and the exhaust hole part 10DA. The air supply hole part 10CA is a through hole formed on the right inner wall 10C of the heating chamber 10. The exhaust hole part 10DA is a through hole formed on the left inner wall 10D of the heating chamber 10. The air supply damper 101 is capable of opening and closing the air supply hole part 10CA of the heating chamber 10. The air supply damper 101 includes a first damper unit and an air supply damper drive unit 101*a*. The air supply damper drive unit 101*a* drives the first damper unit to open and close the air supply hole part 10CA of the heating chamber 10. The exhaust damper 102 is capable of opening and closing the exhaust hole part 10DA of the heating chamber 10. The exhaust damper 102 includes a second damper unit and an exhaust damper drive unit 102*a*. The exhaust damper drive unit 102*a* drives the second damper unit to open and close the exhaust hole part 10DA of the heating chamber 10. The humidity sensor 103 detects the amount of steam contained in the air emitted from the exhaust hole part 10DA.

As illustrated in FIG. 10, the heating chamber 10 further includes a first heating chamber 14A, an oven tray 14B, a second heating chamber 15A, a first partition plate 15B, a third heating chamber 16A, and a second partition plate 16B. A portion of the upper inner wall 10A, the second partition plate 16B, the first partition plate 15B, the right inner wall 10C (see FIG. 9), the left inner wall 10D (see FIG. 9), a portion of the bottom inner wall JOE, and the oven tray 14B form the heating cooking chamber 1A.

The first heating chamber 14A is located on the bottom inner wall 10E side. The oven tray 14B is located substantially in the center portion of the bottom inner wall 10E. The oven tray 14B partitions the first heating chamber 14A and the heating cooking chamber 1A. The oven tray 14B is a plate-like member. The oven tray 14B is attached to the heating chamber 10.

A material of the oven tray 14B includes a ceramic or a glass. Since the material of the oven tray 14B includes the ceramic or the glass, the oven tray 14B facilitates transmission of the microwaves. For this configuration, in the pull-out heating cooking apparatus 1, when the microwave heating mode is implemented, even if the microwaves are supplied from the bottom inner wall 10E side, the object to be heated can be efficiently heated and cooked.

The second heating chamber 15A is located on the rear inner wall 10B side. The first partition plate 15B partitions the second heating chamber 15A and the heating cooking chamber 1A. The first partition plate 15B is a plate-like member. The first partition plate 15B includes a first blow-out hole portion 15C and a first suction hole portion 15D.

The third heating chamber 16A is located on the upper inner wall 10A side. The second partition plate 16B constitutes a substantially center portion of the upper inner wall 10A. The second partition plate 16B partitions the third heating chamber 16A and the heating cooking chamber 1A. The second partition plate 16B is a plate-like member. As illustrated in FIG. 9, the second partition plate 16B includes a second blow-out hole portion 16C and a second suction hole portion 16D. The second blow-out hole portion 16C and the second suction hole portion 16D are located in the center portion of the upper inner wall 10A. The second blow-out hole portion 16C is formed along the outer circumference of the second suction hole portion 16D.

As illustrated in FIG. 6 to FIG. 8, the pull-out heating cooking apparatus 1 includes the pair of left and right slide rails 13, the microwave supply unit 14 (see FIG. 6), the first air sending unit 15 (see FIG. 7), the second air sending unit

16, a grill unit 17 (see FIG. 7), a magnetron fan 18 (see FIG. 6), and an in-chamber exhaust duct 19. The pair of left and right slide rails 13 includes a right slide rail 13*a* (see FIG. 6) and a left slide rail 13*b* (see FIG. 8).

As illustrated in FIG. 6 to FIG. 8, the pair of left and right slide rails 13, the microwave supply unit 14, the first air sending unit 15, the second air sending unit 16, the grill unit 17, the magnetron fan 18, and the in-chamber exhaust duct 19 are formed closer to a rear side than the panel 100. Specifically, as illustrated in FIG. 6, the right slide rail 13*a* is attached closer to a lower side than the air supply damper 101 of the right inner wall 10C of the heating chamber 10 by a right fixing member 130*a* illustrated in FIG. 3. The right fixing member 130*a* is fixed to the right inner wall 10C of the heating chamber 10. As illustrated in FIG. 8, the left slide rail 13*b* is attached on a lower side of the exhaust damper 102 of the left inner wall 10D of the heating chamber 10 by a left fixing member 130*b* illustrated in FIG. 4. The left fixing member 130*b* is fixed to the left inner wall 10*d* of the heating chamber 10. As illustrated in FIG. 6, the microwave supply unit 14 is disposed on the bottom inner wall 10E side of the heating chamber 10. As illustrated in FIG. 7, the first air sending unit 15 is located on the rear inner wall 10B side of the heating chamber 10.

As illustrated in FIG. 7, the second air sending unit 16 is located on the upper inner wall 10A of the heating chamber 10. The grill unit 17 is located on an upper portion of the heating chamber 10 and on an upper portion in the heating cooking chamber 1A. As illustrated in FIG. 6, the magnetron fan 18 is located closer to a lower side than the heating chamber 10. The magnetron fan 18 is located at an end portion on the right side of the pull-out heating cooking apparatus 1 and closer to a front side than a magnetron 141 described below with reference to FIG. 9. The magnetron fan 18 is proximate to the magnetron 141. As illustrated in FIG. 8, the in-chamber exhaust duct 19 supports the exhaust damper 102 of the left inner wall 10D of the heating chamber 10 and extends from below the exhaust damper 102 to the exhaust hole part 100BB of the panel 100. The in-chamber exhaust duct 19 emits air emitted from the exhaust hole part 10DA of the heating chamber 10 from the exhaust hole part 100BB of the panel 100 to the outside of the pull-out heating cooking apparatus 1.

The right slide rail 13*a* slidably supports the right slide member 113*a*. The right slide rail 13*a* is a plate-like member having a front-rear direction as a longitudinal direction.

The left slide rail 13*b* slidably supports the left slide member 113*b*. The left slide rail 13*b* is a plate-like member having a front-rear direction as a longitudinal direction.

The right slide member 113*a* and the left slide member 113*b* slide along the right slide rail 13*a* and the left slide rail 13*b* by the drawer body 11 being moved in the front-rear direction.

The microwave supply unit 14 supplies microwaves into the heating cooking chamber 1A. In other words, the microwave supply unit 14 imparts a microwave heating function to the pull-out heating cooking apparatus 1. As illustrated in FIG. 9, the microwave supply unit 14 includes the magnetron 141, a waveguide 142, an antenna motor 143, and a rotary antenna 144. The magnetron 141, the waveguide 142, and the antenna motor 143 are located outside the heating chamber 10. The rotary antenna 144 is located in the first heating chamber 14A. The magnetron 141 generates the microwaves. The heating chamber 10 includes a power supply hole part 14C. The waveguide 142 guides the generated microwaves to a shaft portion of the rotary antenna 144 inserted into the waveguide 142 via the power supply hole part 14C of the heating chamber 10. As a result, the microwaves are supplied into the heating cooking chamber 1A via the rotary antenna 144. The antenna motor 143 drives the rotary antenna 144. The rotary antenna 144 agitates the microwaves and radiate thereof into the heating cooking chamber 1A.

The first air sending unit 15 supplies the first hot air H1 into the heating cooking chamber 1A. The first air sending unit 15 imparts a first hot air circulation heating function to the pull-out heating cooking apparatus 1. As illustrated in FIG. 10, the first air sending unit 15 includes a first heater 151, a first centrifugal fan 152, a first drive unit 153, and a first energization unit 154. The first heater 151 and the first centrifugal fan 152 are accommodated in the second heating chamber 15A. The first drive unit 153 and the first energization unit 154 are located outside the heating chamber 10. The first energization unit 154 energizes the first heater 151. The energized first heater 151 heats air. The first drive unit 153 drives the first centrifugal fan 152. The first drive unit 153 is, for example, a motor. The driven first centrifugal fan 152 blows the air heated by the first heater 151 into the heating cooking chamber 1A via the first blow-out hole portion 15C. The driven first centrifugal fan 152 takes in the air inside the heating cooking chamber 1A via the first suction hole portion 15D. The first drive unit 153 and the first energization unit 154 of the first air sending unit 15 become a high temperature by driving of the first air sending unit 15.

The second air sending unit 16 supplies the second hot air H2 into the heating cooking chamber 1A. In other words, the second air sending unit 16 imparts a second hot air circulation heating function to the pull-out heating cooking apparatus 1. As illustrated in FIG. 10, the second air sending unit 16 includes a second heater 161, a second centrifugal fan 162, a second drive unit 163, and a second energization unit 164. The second heater 161 and the second centrifugal fan 162 are accommodated in the third heating chamber 16A. The second drive unit 163 and the second energization unit 164 are located outside the heating chamber 10. The second energization unit 164 energizes the second heater 161. The energized second heater 161 heats air. The second drive unit 163 drives the second centrifugal fan 162. The second drive unit 163 is, for example, a motor. As illustrated in FIG. 9, the driven second centrifugal fan 162 blows the air heated by the second heater 161 into the heating cooking chamber 1A via the second blow-out hole portion 16C. Further, the second centrifugal fan 162 takes in the air inside the heating cooking chamber 1A via the second suction hole portion 16D. The second drive unit 163 and the second energization unit 164 of the second air sending unit 16 become a high temperature by driving of the second air sending unit 16.

The grill unit 17 supplies heat into the heating cooking chamber 1A. The grill unit 17 imparts a grill heating function to the pull-out heating cooking apparatus 1. As illustrated in FIG. 9, the grill unit 17 includes a heating cooking heater unit 171 and a third energization unit 172. The heating cooking heater unit 171 is located in the heating cooking chamber 1A. The third energization unit 172 is located outside the heating chamber 10. Specifically, as illustrated in FIG. 4, the third energization unit 172 is located closer to an upper side than the exhaust damper 102 of the left inner wall 10D of the heating chamber 10. The third energization unit 172 projects from the left inner wall 10D of the heating chamber 10. The third energization unit 172 energizes the heating cooking heater unit 171. The energized heating cooking heater unit 171 generates heat.

The third energization unit 172 of the grill unit 17 generates heat by driving of the grill unit 17.

The temperature of the outer surface of the heating chamber 10 is liable to be a high temperature, as caused along with increase in temperature in the heating cooking chamber 1A due to driving of the first air sending unit 15, the second air sending unit 16, or the grill unit 17. The right fixing member 130*a* and the right slide rail 13*a* illustrated in FIG. 3, and the left fixing member 130*b* and the left slide rail 13*b* illustrated in FIG. 4 are made of metals. Heat on the outer surface of the heating chamber 10 is easily thermally conductive to the right fixing member 130*a*, the right slide rail 13*a*, the left fixing member 130*b*, and the left slide rail 13*b*. Thus, the right slide rail 13*a* supported by the right fixing member 130*a* and the left slide rail 13*b* supported by the left fixing member 130*b* become a high temperature, as caused along with increase in temperature in the heating cooking chamber 1A. As a result, the right slide member 113*a* supported by the right slide rail 13*a* and the left slide member 113*b* supported by the left slide rail 13*b* become a high temperature, as caused along with increase in temperature in the heating cooking chamber 1A.

The magnetron fan 18 cools the magnetron 141 of the microwave supply unit 14. The performance characteristics of the magnetron 141 depend on the temperature of the magnetron 141. The magnetron fan 18 circulates the air taken in from the plurality of air intake hole parts 100BA to the magnetron 141. Owing to this configuration, the magnetron 141 is cooled. As a result, a fluctuation in the performance characteristics of the magnetron 141 is suppressed. The magnetron fan 18 is, for example, a sirocco fan.

As illustrated in FIG. 3 and FIG. 4, the pull-out heating cooking apparatus 1 includes a pair of left and right in-chamber light components 51, and a pair of left and right latch switches 52. The pair of left and right in-chamber light components 51 includes a right in-chamber light component 51*a* and a left in-chamber light component 51*b*. The pair of left and right latch switches 52 includes a right latch switch 52*a* and a left latch switch 52*b*.

As illustrated in FIG. 3, the right in-chamber light component 51*a* and the right latch switch 52*a* are located on the right inner wall 10C of the heating chamber 10. Specifically, the right in-chamber light component 51*a* is located closer to a front than the air supply damper 101. The right latch switch 52*a* is located closer to an upper than the right in-chamber light component 51*a*. As illustrated in FIG. 4, the left in-chamber light component 51*b* and the left latch switch 52*b* are located on the left inner wall 10D of the heating chamber 10. Specifically, the left in-chamber light component 51*b* is located closer to a front than the exhaust damper 102. The left latch switch 52*b* is located closer to an upper than the left in-chamber light component 51*b*.

The pair of left and right in-chamber light components 51 light up the inside of the heating cooking chamber 1A of the heating chamber 10. The pair of left and right latch switches 52 control energization for driving each of the microwave supply unit 14, the first air sending unit 15, the second air sending unit 16, and the grill unit 17, based on the opened state or the closed state of the drawer body 11. Specifically, the pair of left and right latch switches 52 interrupts energization for driving each of the microwave supply unit 14, the first air sending unit 15, the second air sending unit 16, and the grill unit 17, when the drawer body 11 is in the opened state. The pair of left and right latch switches 52 do not interrupt the energization for driving each of the microwave supply unit 14, the first air sending unit 15, the second air sending unit 16, and the grill unit 17, when the drawer body 11 is in the closed state.

Figure 11:
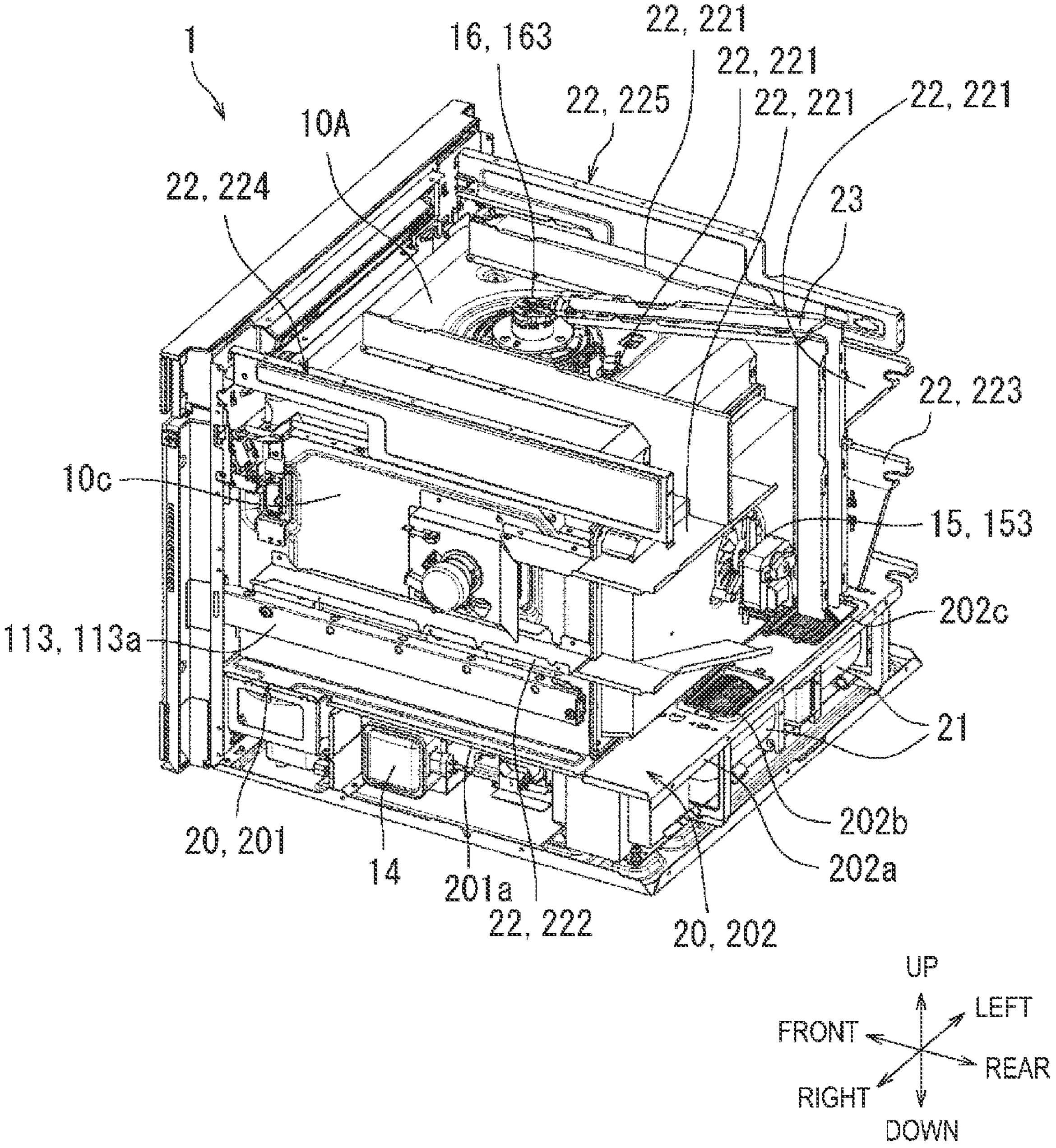
FIG. 11 is a perspective view illustrating the pull-out heating cooking apparatus according to the first embodiment of the present invention.
Figure 12:
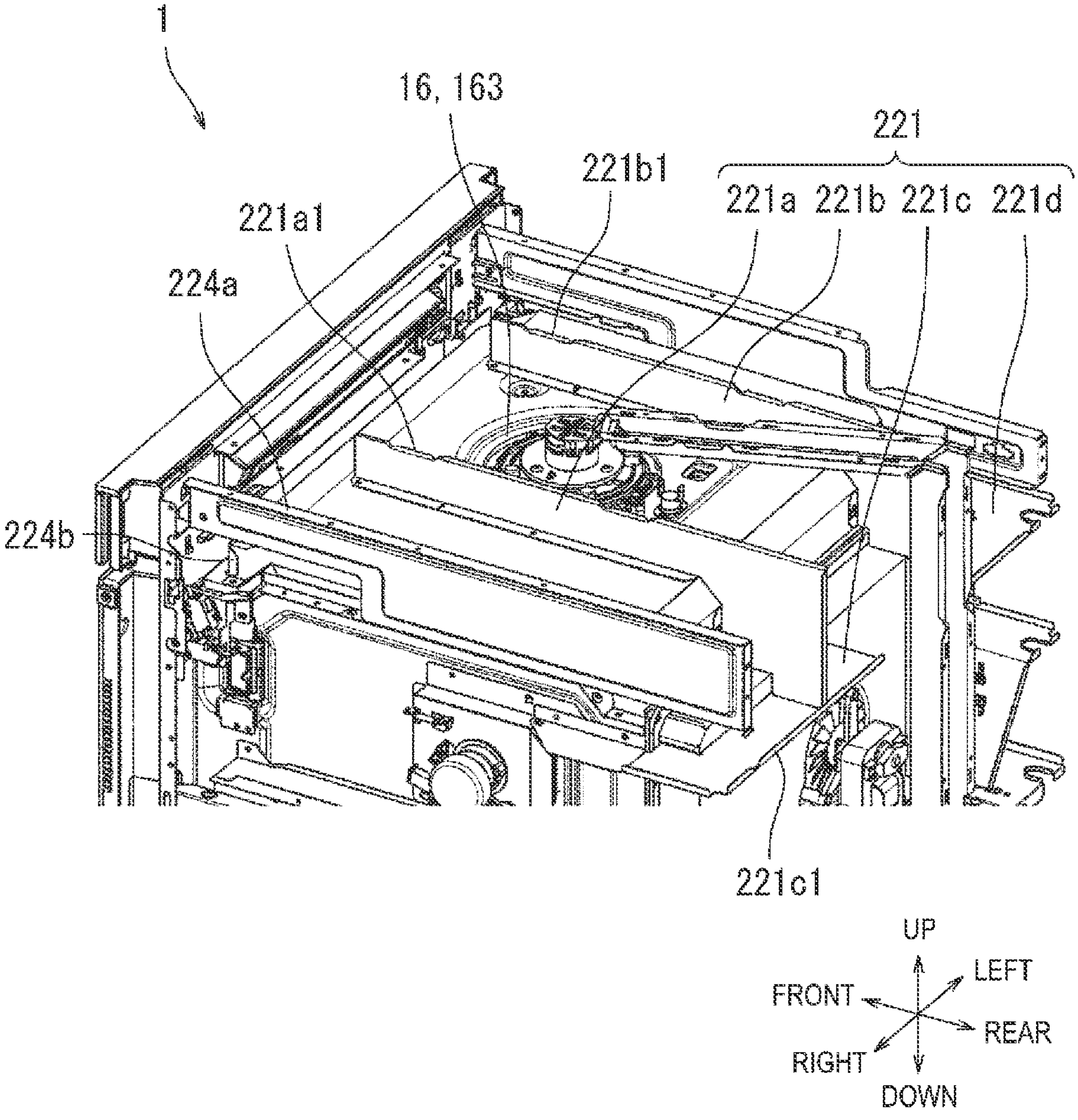
FIG. 12 is a perspective view illustrating the pull-out heating cooking apparatus according to the first embodiment of the present invention.
Figure 13:
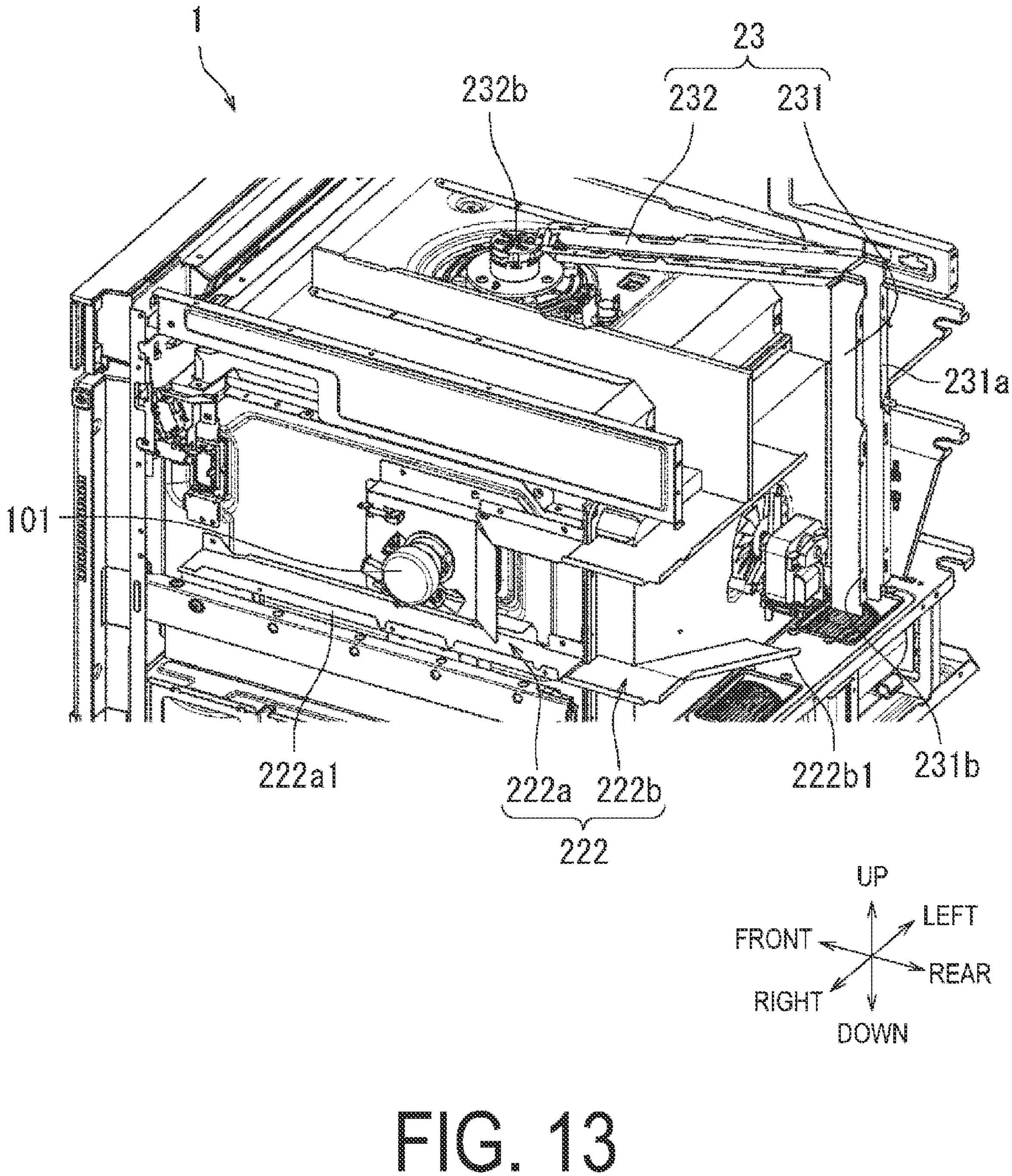
FIG. 13 is a perspective view illustrating the pull-out heating cooking apparatus according to the first embodiment of the present invention.
Figure 14:
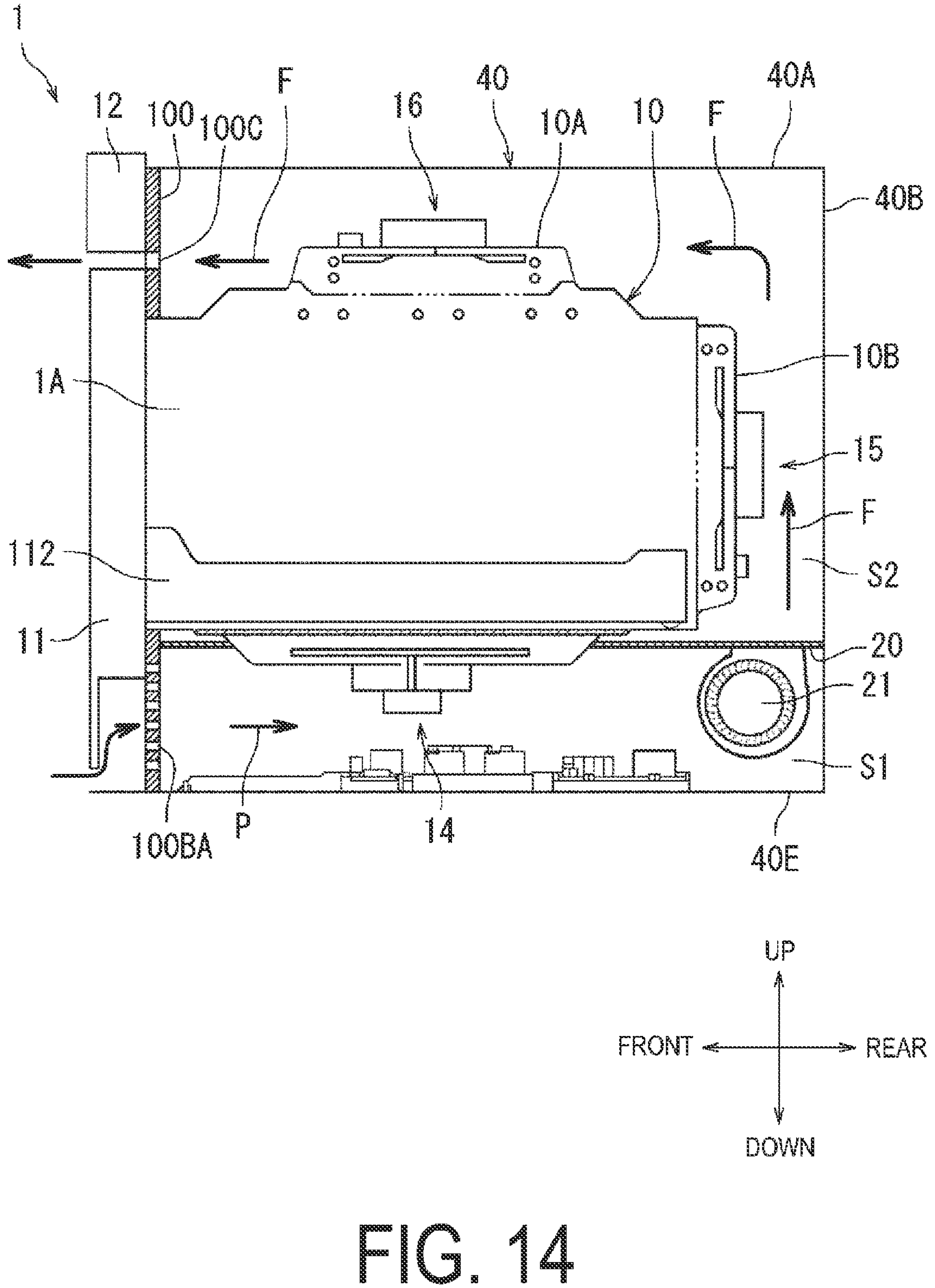
FIG. 14 is a diagram illustrating a schematic cross section of the pull-out heating cooking apparatus according to the first embodiment of the present invention.

Next, with reference to FIG. 8 and FIG. 11 to FIG. 14, the configuration of the pull-out heating cooking apparatus 1 will be described in further detail. FIG. 11 to FIG. 13 are perspective views illustrating the pull-out heating cooking apparatus 1 according to the first embodiment. FIG. 14 is a diagram illustrating a schematic cross section of the pull-out heating cooking apparatus 1 according to the first embodiment. More specifically, FIG. 11 illustrates the pull-out heating cooking apparatus 1 as viewed diagonally from an upper right side from behind. FIG. 12 is an enlarged perspective view of an upper surface of the pull-out heating cooking apparatus 1 illustrated in FIG. 11. FIG. 13 is an enlarged perspective view of an upper surface of the pull-out heating cooking apparatus 1 illustrated in FIG. 12. FIG. 14 illustrates a cross section of the pull-out heating cooking apparatus 1 taken along a plane orthogonal to the left-right direction.

As illustrated in FIG. 8 and FIG. 11, the pull-out heating cooking apparatus 1 further includes a partition plate 20, a cooling fan 21, a plurality of air deflecting plates 22, and a duct member 23. The cooling fan 21 is an example of a fan.

As illustrated in FIG. 11, the partition plate 20 is located closer to a lower side than the pair of left and right slide members 113 and the first air sending unit 15. The partition plate 20 is attached to the rear inner wall 10B, the right inner wall 10C, and the left inner wall 10D of the heating chamber 10 from an end portion on the front side of the right inner wall 10C to an end portion on the front side of the left inner wall 10D. The cooling fan 21 is located closer to a lower side than the partition plate 20. As illustrated in FIG. 14, the cooling fan 21 is located at the same height as the height of the air intake hole parts 100BA of the panel 100. The cooling fan 21 is located on a rear side of the heating chamber 10. As illustrated in FIG. 11, the plurality of air deflecting plates 22 are located closer to an upper side than the partition plate 20. The plurality of air deflecting plates 22 are attached to the upper inner wall 10A, the rear inner wall 10B, the right inner wall 10C, and the left inner wall 10D (see FIG. 8) of the heating chamber 10. The duct member 23 is located closer to an upper side than the partition plate 20. The duct member 23 extends from the rear side of the heating chamber 10 to the second air sending unit 16.

As illustrated in FIG. 14, the partition plate 20 of the pull-out heating cooking apparatus 1 partitions a gap between the outer surface of the heating chamber 10 and the inner surface of the main body outer case 40 into a first space S1 and a second space S2. The inner surface of the main body outer case 40 is formed of surfaces on the heating chamber 10 side of the upper outer wall 40A, the rear outer wall 40B, the right outer wall 40C, the left outer wall 40D, and the bottom outer wall 40E. Hereinafter, the first space S1 is referred to as an "air intake space S1". The second space S2 is referred to as an "exhaust space S2". The air intake space S1 indicates a space closer to a lower side than the partition plate 20 of the gap between the outer surface of the heating chamber 10 and the inner surface of the main body outer case 40. The air intake space S1 indicates a space for guiding the air taken in from the air intake hole parts 100BA to the cooling fan 21 by driving of the cooling fan 21. The exhaust space S2 indicates a space closer to an upper side than the partition plate 20 of the gap between the outer surface of the heating chamber 10 and the inner surface of the main body outer case 40. The exhaust space S2 indicates a space for guiding the air blown out from the cooling fan 21 to the exhaust hole parts 100C by driving of the cooling fan 21. In other words, the air intake space S1 and the exhaust space S2 function as ducts. In the first embodiment, a portion of the bottom inner wall 10E of the heating chamber 10 and the magnetron 141 of the microwave supply unit 14 are located in the air intake space S1. The upper inner wall 10A, the rear inner wall 10B, the right inner wall 10C, and the left inner wall 10D of the heating chamber 10 are located in the exhaust space S2. In other words, as illustrated in FIG. 8 and FIG. 11, the pair of left and right slide rails 13, the first air sending unit 15, the second air sending unit 16, and the third energization unit 172 of the grill unit 17 are located in the exhaust space S2. Thus, the temperature of the air in the exhaust space S2 is liable to be higher than the temperature of the air in the air intake space S1 by driving of the pull-out heating cooking apparatus 1. Hereinafter, the pair of left and right slide rails 13, the first air sending unit 15, the second air sending unit 16, and the third energization unit 172 of the grill unit 17 may be referred to as "high temperature units".

The partition plate 20 includes a first flat plate part 201, a second flat plate part 202, and a third flat plate part 203. The first flat plate part 201 is located on the right inner wall 10C of the heating chamber 10. The second flat plate part 202 is located on the rear inner wall 10B of the heating chamber 10. The third flat plate part 203 is located on the right inner wall 10C of the heating chamber 10.

As illustrated in FIG. 11, the first flat plate part 201 is a flat plate having a front-rear direction as a longitudinal direction. The first flat plate part 201 includes a bent portion 201*a* on a right side edge portion. The bent portion 201*a* is in contact with the right outer wall 40C of the main body outer case 40 (see FIG. 2(*a*) and FIG. 2(*b*)).

The second flat plate part 202 is a flat plate having a left-right direction as a longitudinal direction. The second flat plate part 202 includes a bent portion 202*a* at a right side edge portion, a left edge portion, and a rear side edge portion. The bent portion 202*a* is in contact with the right outer wall 40C, the left outer wall 40D, and the rear outer wall 40B of the main body outer case 40 (see FIG. 2(*a*) and FIG. 2(*b*)). The second flat plate part 202 includes a first opening part 202*b* and a second opening part 202*c*. The first opening part 202*b* and the second opening part 202*c* guide the air blown out by the cooling fan 21 to the exhaust space S2.

As illustrated in FIG. 8, the third flat plate part 203 is a flat plate having a front-rear direction as a longitudinal direction. The third flat plate part 203 includes a bent portion 203*a* on a left side edge portion. The bent portion 203*a* is in contact with the left outer wall 40D of the main body outer case 40 (see FIG. 2(*a*) and FIG. 2(*b*)).

The cooling fan 21 takes in air from the plurality of air intake hole parts 100BA described with reference to FIG. 5 to the air intake space S1. The cooling fan 21 circulates the air to the cooling fan 21 via the air intake space S1. The cooling fan 21 takes in the air in the air intake space S1. The cooling fan 21 blows out the air taken in in the air intake space S1 to the exhaust space S2. The cooling fan 21 circulates the air to the plurality of exhaust hole parts 100C (see FIG. 5) via the exhaust space S2. The cooling fan 21 emits the air from the plurality of exhaust hole parts 100C to the outside of the pull-out heating cooking apparatus 1. In the first embodiment, the cooling fan 21 is a cross flow fan.

The plurality of air deflecting plates 22 guide the air blown out from the cooling fan 21 to the exhaust space S2 to the high temperature units and distribute the amount of air required to cool each of the high temperature units. The plurality of air deflecting plates 22 include a first air deflecting plate 221, a second air deflecting plate 222, a third air deflecting plate 223, a fourth air deflecting plate 224, and a fifth air deflecting plate 225. In other words, the plurality of air deflecting plates 22 split an exhaust flow path F of the air blown out to an upper side from the cooling fan 21 into five exhaust flow paths. The first air deflecting plate 221 functions as an air deflecting plate for the second air sending unit. The second air deflecting plate 222 functions as an air deflecting plate for the right slide member. The third air deflecting plate 223 functions as an air deflecting plate for the left slide member. The fourth air deflecting plate 224 and the fifth air deflecting plate 225 function as air deflecting plates for the grill unit.

The first air deflecting plate 221 guides the air blown out from the cooling fan 21 to the second drive unit 163 of the second air sending unit 16 and distribute the amount of air required to cool the second drive unit 163 of the second air sending unit 16. As illustrated in FIG. 12, the first air deflecting plate 221 includes a first plate part 221*a*, a second plate part 221*b*, a third plate part 221*c*, and a fourth plate part 221*d*. The first plate part 221*a* and the second plate part 221*b* are attached to the upper inner wall 10A and the rear inner wall 10B of the heating chamber 10. The first plate part 221*a* and the second plate part 221*b* face each other in the left-right direction. The first plate part 221*a* is located on the right side of the second air sending unit 16. The second plate part 221*b* is located on the left side of the second air sending unit 16. The third plate part 221*c* is attached to the rear inner wall 10B and the right inner wall 10C of the heating chamber 10. The fourth plate part 221*d* is attached to the rear inner wall 10B and the left inner wall 10D of the heating chamber 10.

As illustrated in FIG. 12, the first plate part 221*a* and the second plate part 221*b* are substantially L-shaped plates having a front-rear direction as a longitudinal direction. Front side edge portions of the first plate part 221*a* and the second plate part 221*b* are not in contact with the operation panel 12. The first plate part 221*a* includes a bent portion 221*a*1 on an upper side edge portion. The second plate part 221*b* includes a bent portion 221*b*1 on an upper side edge portion. The bent portion 221*a*1 and the bent portion 221*b*1 are in contact with the upper outer wall 40A and the rear outer wall 40B, of the main body outer case 40 (see FIG. 2(*a*) and FIG. 2(*b*)).

As illustrated in FIG. 12, the third plate part 221*c* and the fourth plate part 221*d* are substantially L-shaped plates having a left-right direction as a longitudinal direction. The third plate part 221*c* includes a bent portion 221*c*1 on a rear side edge portion and a right side edge portion. The bent portion 221*cl* is in contact with the right outer wall 40C and the rear outer wall 40B of the main body outer case 40 (see FIG. 2(*a*) and FIG. 2(*b*)). The fourth plate part 221*d* includes a bent portion 221*d*1 on a rear side edge portion and a left side edge portion. The bent portion 221*d*1 is in contact with the left outer wall 40D and the rear outer wall 40B of the main body outer case 40 (see FIG. 2(*a*) and FIG. 2(*b*)).

The second air deflecting plate 222 guides the air blown out from the cooling fan 21 to the right slide rail 13*a* and distributes the amount of air required to cool the right slide rail 13*a*. As illustrated in FIG. 13, the second air deflecting plate 222 includes a first plate part 222*a* and a second plate part 222*b*. The first plate part 222*a* is attached to the right inner wall 10C of the heating chamber 10. The first plate part 222*a* is located closer to an upper side than the right slide rail 13*a* and closer to a lower side than the air supply damper 101. The second plate part 222*b* is attached to the rear sides of the rear inner wall 10B and the right inner wall 10C of the heating chamber 10. The first plate part 222*a* and the second plate part 222*b* are connected to each other.

The first plate part 222*a* is a flat plate having a front-rear direction as a longitudinal direction. The first plate part 222*a* includes a bent portion 222*al* on a right side edge portion. The bent portion 222*a*1 is in contact with the right outer wall 40C of the main body outer case 40 (see FIG. 2(*a*) and FIG. 2(*b*)).

The second plate part 222*b* is a substantially L-shaped plate having a left-right direction as a longitudinal direction. The second plate part 222*b* includes a bent portion 222*b*1 on a rear side edge portion and a right side edge portion. The bent portion 222*b*1 is in contact with the right outer wall 40C and the rear outer wall 40B of the main body outer case 40 (see FIG. 2(*a*) and FIG. 2(*b*)).

The third air deflecting plate 223 guides the air blown out from the cooling fan 21 to the left slide rail 13*b* and distributes the amount of air required to cool the left slide rail 13*b*. As illustrated in FIG. 8, the third air deflecting plate 223 includes a first plate part 223*a* and a second plate part 223*b*. The first plate part 223*a* is attached to the left inner wall 10D of the heating chamber 10. The first plate part 223*a* is located closer to an upper side than the left slide rail 13*b* and closer to a lower side than the exhaust damper 102. The second plate part 223*b* is attached to the rear sides of the rear inner wall 10B and the left inner wall 10D of the heating chamber 10. The first plate part 223*a* and the second plate part 223*b* are connected to each other.

The first plate part 223*a* is a flat plate having a front-rear direction as a longitudinal direction. The first plate part 223*a* includes a bent portion 223*al* on a left side edge portion. The bent portion 223*a*1 is in contact with the left outer wall 40D of the main body outer case 40 (see FIG. 2(*a*) and FIG. 2(*b*)).

The second plate part 223*b* is a substantially L-shaped plate having a left-right direction as a longitudinal direction. The second plate part 223*b* includes a bent portion 223*b*1 on a rear side edge portion and a right side edge portion. The bent portion 223*b*1 is in contact with the left outer wall 40D and the rear outer wall 40B of the main body outer case 40 (see FIG. 2(*a*) and FIG. 2(*b*)).

The fourth air deflecting plate 224 guides the air circulating on the right inner wall 10C side of the heating chamber 10 to the upper inner wall 10A of the heating chamber 10. As illustrated in FIG. 6, the fourth air deflecting plate 224 is attached closer to an upper side than the air supply damper 101 of the right inner wall 10C of the heating chamber 10. The fourth air deflecting plate 224 is a flat plate having a front-rear direction as a longitudinal direction. The fourth air deflecting plate 224 includes a bent portion 224*a* on an upper side edge portion and a rear side side edge portion. The bent portion 224*a* is in contact with the upper outer wall 40A and the rear outer wall 40B, of the main body outer case 40 (see FIG. 2(*a*) and FIG. 2(*b*)). The fourth air deflecting plate 224 includes a first notch portion 224*b* on a lower side of a front side edge portion. The first notch portion 224*b* guides the air circulating on the right inner wall 10C side of the heating chamber 10 to a front side of the upper inner wall 10A of the heating chamber 10.

The fifth air deflecting plate 225 guides the air circulating on the left inner wall 10D side of the heating chamber 10 to the upper inner wall 10A of the heating chamber 10. As illustrated in FIG. 7, the fifth air deflecting plate 225 is attached closer to an upper side than the exhaust damper 102 of the left inner wall 10D of the heating chamber 10. The fifth air deflecting plate 225 is a flat plate having a front-rear direction as a longitudinal direction. The fifth air deflecting plate 225 includes a bent portion 225*a* on an upper side edge portion and a lower side side edge portion. The bent portion 225*a* is in contact with the upper outer wall 40A and the rear outer wall 40B, of the main body outer case 40 (see FIG. 2(*a*) and FIG. 2(*b*)). The fifth air deflecting plate 225 includes a second notch portion 225*b* on a lower side of a front side edge portion. The second notch portion 225*b* guides the air circulating on the left inner wall 10D side of the heating chamber 10 to a front side of the upper inner wall 10A of the heating chamber 10.

The duct member 23 guides the air blown out from the cooling fan 21 to the second drive unit 163 of the second air sending unit 16, with forming a path away from the outer surface of the heating chamber 10, along the main body outer case 40. As illustrated in FIG. 13, the duct member 23 includes a first groove part 231 and a second groove part 232. The first groove part 231 and the second groove part 232 communicate with each other. The first groove part 231 is disposed closer to a rear side than the rear inner wall 10B of the heating chamber 10. The second groove part 232 is disposed closer to an upper side than the upper inner wall 10A of the heating chamber 10. In other words, the first groove part 231 and the second groove part 232 are not in contact with the outer surface of the heating chamber 10. Additionally, the duct member 23 forms an exhaust flow path different from exhaust flow paths formed of the air deflecting plates 22.

The first groove part 231 has an up-down direction as a longitudinal direction. The first groove part 231 includes a bent portion 231*a* on an upper side edge portion and a rear side edge portion. The bent portion 231*a* is in contact with the upper outer wall 40A and the rear outer wall 40B, of the main body outer case 40 (see FIG. 2(*a*) and FIG. 2(*b*)). The first groove part 231 is a groove-shaped member having an up-down direction as a longitudinal direction. A first edge portion 231*b* (inlet) on a lower side of the first groove part 231 is located on an upper side of the cooling fan 21.

The second groove part 232 is a groove-shaped member having a front-rear direction as a longitudinal direction. The second groove part 232 includes a bent portion 232*a* on an upper side edge portion. The bent portion 232*a* is in contact with the upper outer wall 40A of the main body outer case 40 (see FIG. 2(*a*) and FIG. 2(*b*)). A second end portion 232*b* (outlet) on the front side of the second groove part 232 is proximate to the second drive unit 163 of the second air sending unit 16. Since the second end portion 232*b* (outlet) on the front side of the second groove part 232 includes an opening part in proximity to the second drive unit 163 of the second air sending unit 16, the air blown out from the cooling fan 21 is easily guided to the second drive unit 163 of the second air sending unit 16.

As described above, the duct member 23 is in contact with the upper outer wall 40A and the rear outer wall 40B of the main body outer case 40 of the pull-out heating cooking apparatus 1, thereby functioning as a duct. In other words, the duct member 23 does not allow the air blown out from the cooling fan 21 to be in contact with the outer surface of the heating chamber 10, and guides the air to the second drive unit 163 of the second air sending unit 16.

Figure 15:
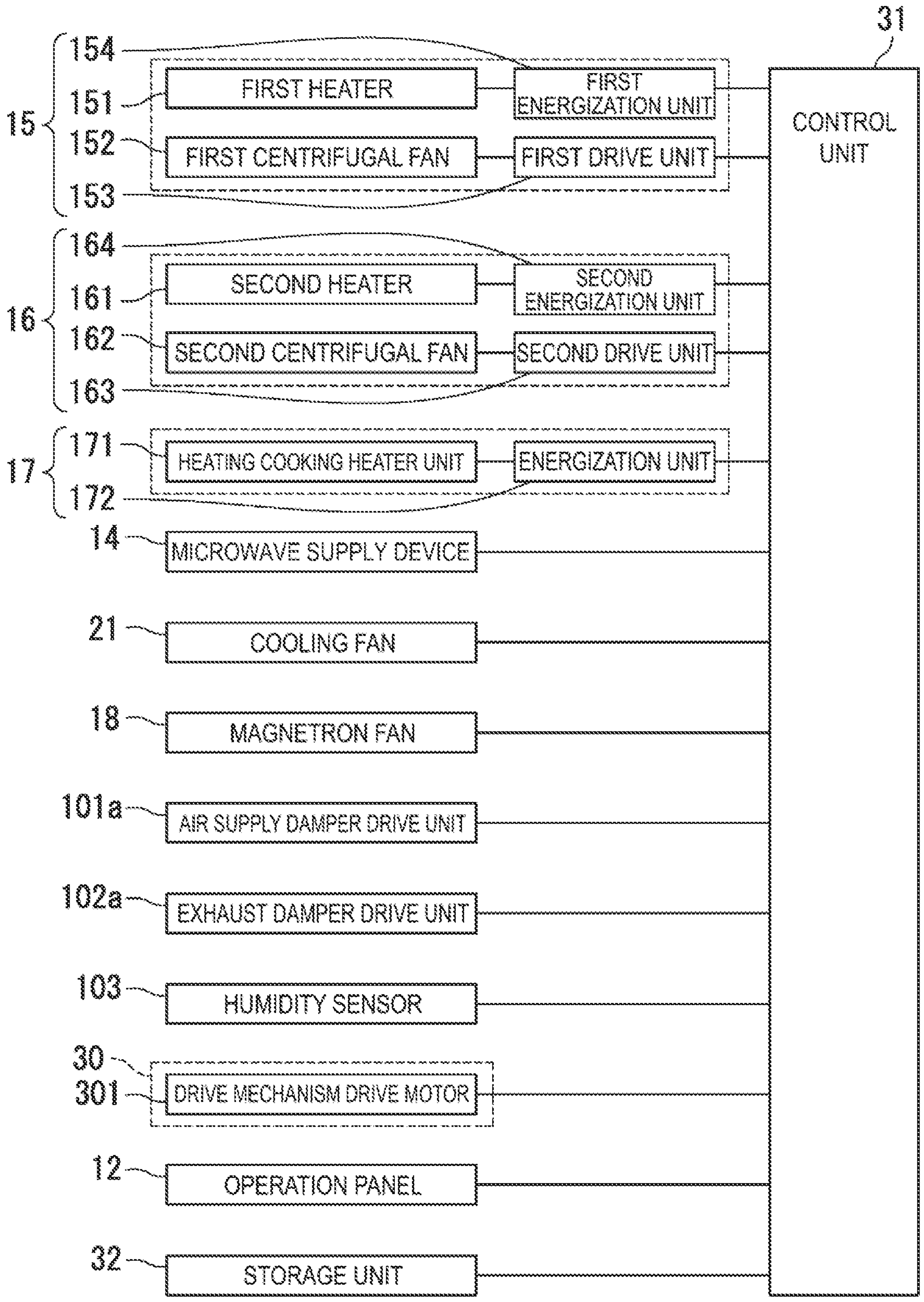
FIG. 15 is a block diagram illustrating a configuration of the pull-out heating cooking apparatus according to the first embodiment of the present invention.

A configuration of the pull-out heating cooking apparatus 1 will be described in detail with reference to FIG. 15. FIG. 15 is a block diagram illustrating the configuration of the pull-out heating cooking apparatus 1.

As illustrated in FIG. 15, the pull-out heating cooking apparatus 1 further includes the drive mechanism 30, a control unit 31, and a storage unit 32.

The drive mechanism 30 includes a drive mechanism drive motor 301 and a rack pinion mechanism. The rack pinion mechanism includes a pinion. The pinion is attached to a tip end portion of a motor shaft of the drive mechanism drive motor 301. The pinion is engaged with the rack part on the rear side of the support member 114 described with reference to FIG. 3 and FIG. 4.

The control unit 31 is a hardware circuit that includes a processor such as a central processing unit (CPU). The control unit 31 executes control programs stored in the storage unit 32, thereby controlling the first heater 151, the first drive unit 153, the second heater 161, the second drive unit 163, the third energization unit 172, the microwave supply unit 14, the cooling fan 21, the magnetron fan 18, the air supply damper drive unit 101*a*, the exhaust damper drive unit 102*a* the drive mechanism drive motor 301, the humidity sensor 103, the operation panel 12, and the storage unit 32.

The control unit 31 controls driving of the cooling fan 21 and the magnetron fan 18 according to the type of heating cooking mode received by the operation panel 12. When being operated by a user, the operation panel 12 receives a command for setting a heating cooking mode of any of the microwave heating mode, the first hot air circulation heating mode, the second hot air circulation heating mode, and the grill heating mode. The control unit 31 sets the heating cooking mode according to the command received by the operation panel 12. For example, when the control unit 31 sets the first hot air circulation heating mode, the second hot air circulation heating mode, or the grill heating mode as the heating cooking mode, the control unit 31 drives the cooling fan 21. In this case, the control unit 31 does not drive the magnetron fan 18. When the control unit 31 sets the microwave heating mode as the heating cooking mode, for example, the control unit 31 drives the magnetron fan 18. At this time, the control unit 31 may drive the cooling fan 21.

The storage unit 32 includes a random access memory (RAM) and a read only memory (ROM). The storage unit 32 stores control programs used for controlling operations of each part of the pull-out heating cooking apparatus 1. The storage unit 32 stores setting information input when the operation panel 12 is operated.

Figure 16:
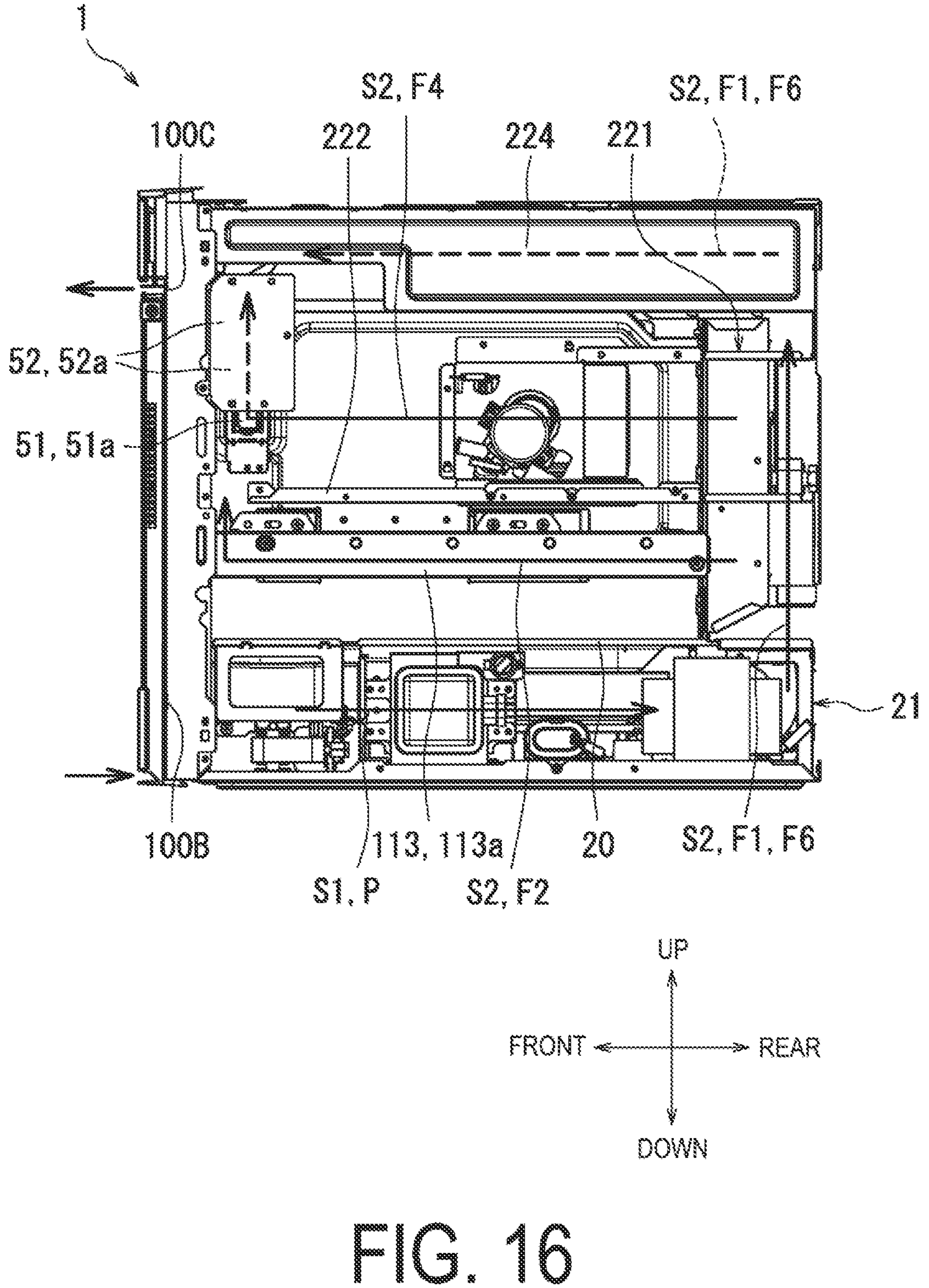
FIG. 16 is a diagram illustrating a right side surface of the pull-out heating cooking apparatus according to the first embodiment of the present invention.
Figure 17:
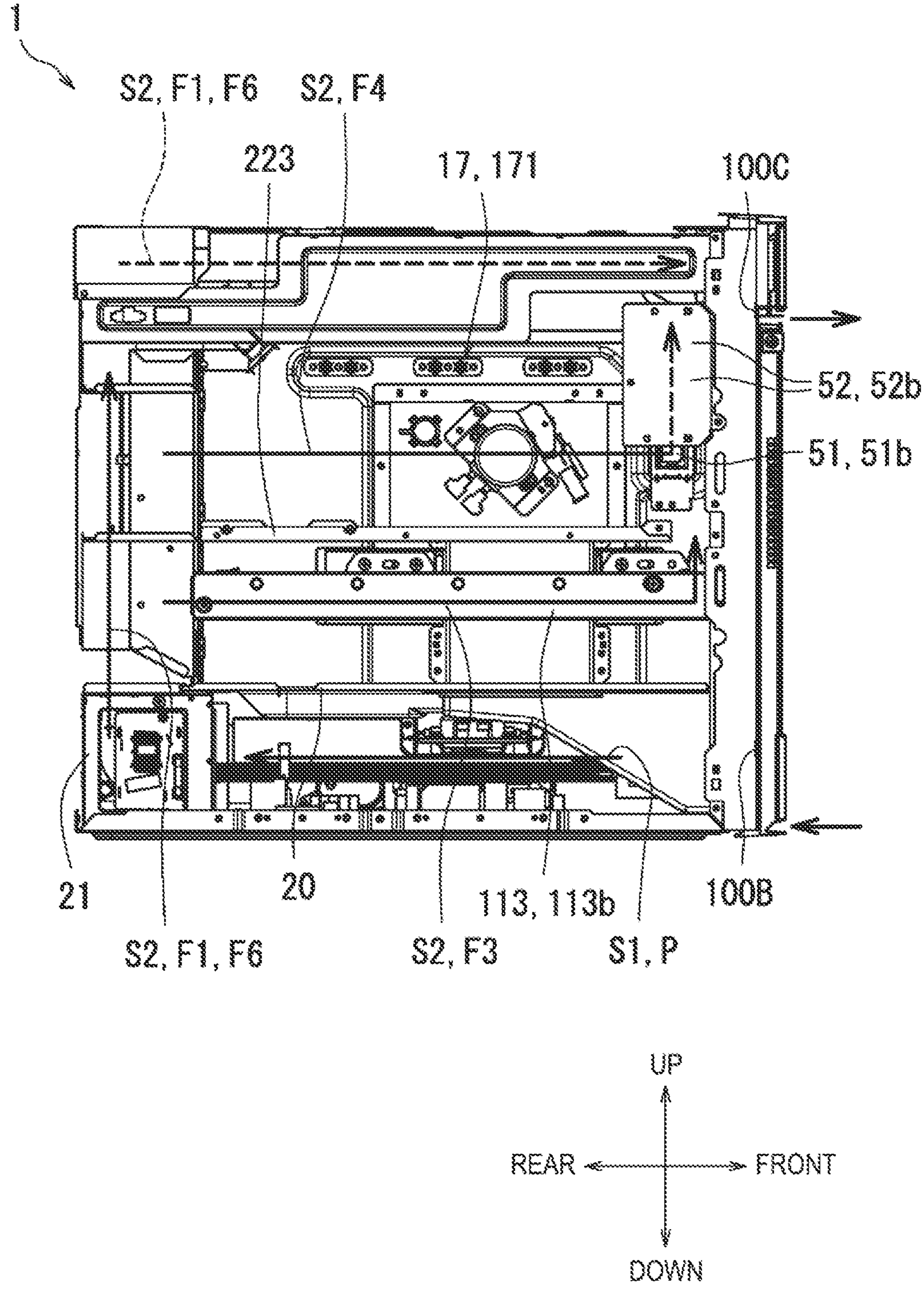
FIG. 17 is a diagram illustrating a left side surface of the pull-out heating cooking apparatus according to the first embodiment of the present invention.
Figure 18:
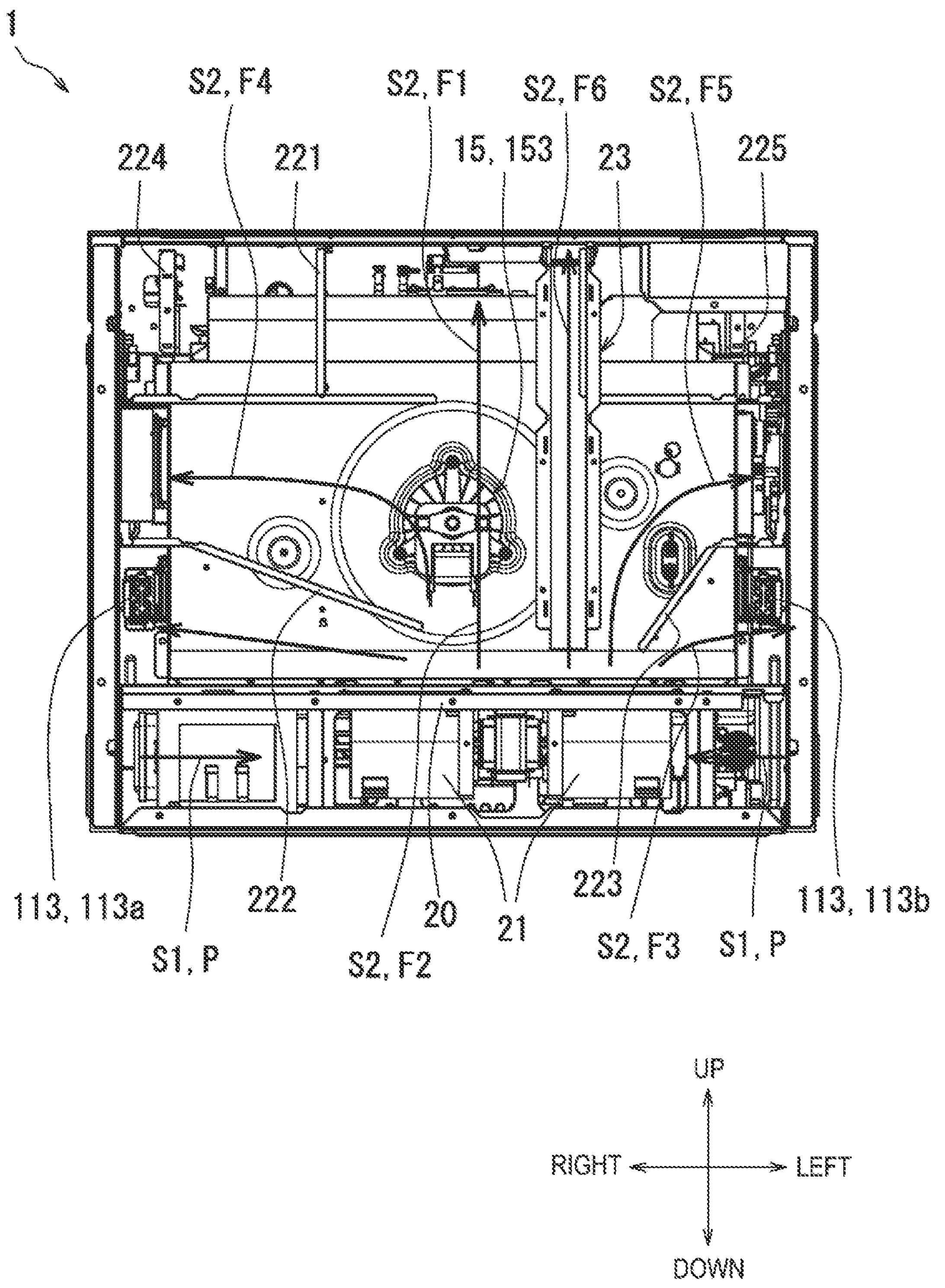
FIG. 18 is a diagram illustrating a rear surface of the pull-out heating cooking apparatus according to the first embodiment of the present invention.
Figure 19:
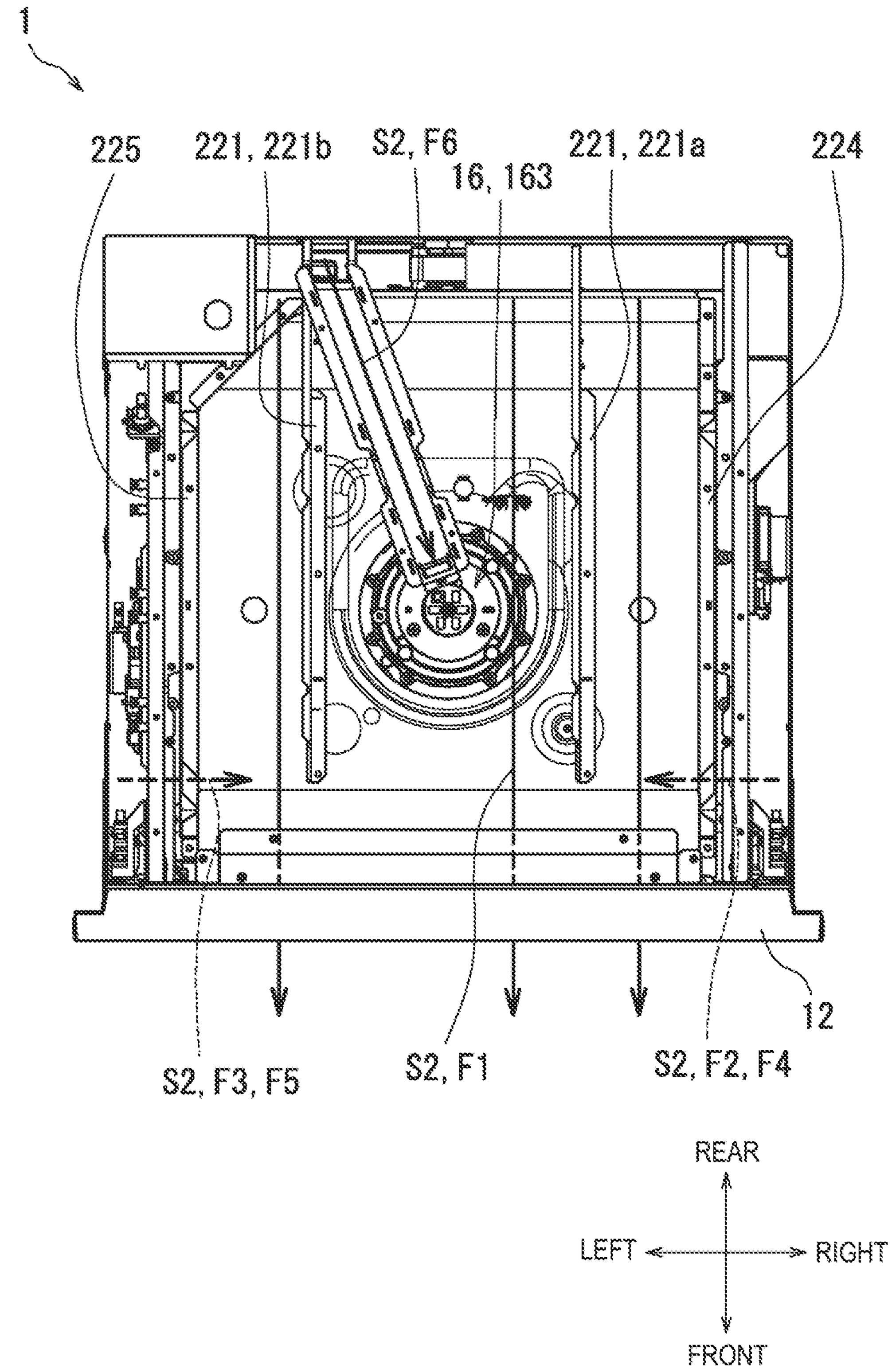
FIG. 19 is a diagram illustrating an upper surface of the pull-out heating cooking apparatus according to the first embodiment of the present invention.

Next, an air path of an air flow inside the pull-out heating cooking apparatus 1 generated by driving of the cooling fan 21 will be described with reference to FIG. 16 to FIG. 19. FIG. 16 is a diagram illustrating the right side surface of the pull-out heating cooking apparatus 1 according to the first embodiment. FIG. 17 is a diagram illustrating a left side surface of the pull-out heating cooking apparatus 1 according to the first embodiment. FIG. 18 is a diagram illustrating a rear surface of the pull-out heating cooking apparatus 1 according to the first embodiment. FIG. 19 is a diagram illustrating an upper surface of the pull-out heating cooking apparatus 1 according to the first embodiment. Note that in FIG. 16 to FIG. 19, the upper outer wall 40A, the rear outer wall 40B, the right outer wall 40C, and the left outer wall 40D are omitted.

As illustrated in FIG. 16 and FIG. 17, in the first embodiment, when the cooling fan 21 is driven, the air flows from the plurality of air intake hole parts 100BA of the panel 100 into the inside of the pull-out heating cooking apparatus 1. An intake flow path P is formed of the partition plate 20. In the intake flow path P, the air flowing into the inside of the pull-out heating cooking apparatus 1 is guided to the cooling fan 21 via the air intake space S1. At this time, the air flow circulating in the air intake space S1 cools a power supply and electrical components that are located in the air intake space S1. The air guided to the cooling fan 21 is then blown upward into the exhaust space S2.

The air blown into the exhaust space S2 is split mainly into six exhaust flow paths, a first exhaust flow path F1 to a sixth exhaust flow path F6, by the air deflecting plates 22 and the duct member 23.

The first exhaust flow path F1 is formed of the first air deflecting plate 221. As illustrated in FIG. 16 to FIG. 18, in the first exhaust flow path F1, the air blown into the exhaust space S2 circulates toward the upper inner wall 10A of the heating chamber 10 along the rear inner wall 10B of the heating chamber 10 by the first air deflecting plate 221. At this time, the air flow in the first exhaust flow path F1 cools the first drive unit 153 of the first air sending unit 15. Subsequently, as illustrated in FIG. 19, the air flow in the first exhaust flow path F1 circulates toward the plurality of exhaust hole parts 100C along the upper inner wall 10A of the heating chamber 10. At this time, the air flow in the first exhaust flow path F1 cools the upper inner wall 10A of the heating chamber 10 and the second drive unit 163 of the second air sending unit 16. Subsequently, the air flow having a temperature increased through heat exchange due to cooling is emitted to the outside of the pull-out heating cooking apparatus 1 through the plurality of exhaust hole parts 100C of the panel 100.

The second exhaust flow path F2 is formed of the second air deflecting plate 222. As illustrated in FIG. 16 to FIG. 19, in the second exhaust flow path F2, the air blown into the exhaust space S2 circulates toward the right slide rail 13*a* of the right inner wall 10C of the heating chamber 10 along the rear inner wall 10B of the heating chamber 10 by the second air deflecting plate 222. The air flow in the second exhaust flow path F2 circulates along the right inner wall 10C of the heating chamber 10, and then circulates toward the upper inner wall 10A of the heating chamber 10. At this time, the air flow in the second exhaust flow path F2 cools the right slide member 113*a* and the right slide rail 13*a*. Subsequently, as illustrated in FIG. 19, the air flow in the second exhaust flow path F2 circulates toward the plurality of exhaust hole parts 100C along the upper inner wall 10A of the heating chamber 10. At this time, the air flow in the second exhaust flow path F2 joins with the air flow in another exhaust flow path different from the second exhaust flow path F2. Subsequently, the air flow having a temperature increased through heat exchange due to cooling is emitted to the outside of the pull-out heating cooking apparatus 1 through the plurality of exhaust hole parts 100C of the panel 100.

The third exhaust flow path F3 is formed of the third air deflecting plate 223. As illustrated in FIG. 16 to FIG. 19, in the third exhaust flow path F3, the air blown into the exhaust space S2 circulates toward the left slide rail 13*b* of the left inner wall 10D of the heating chamber 10 along the rear inner wall 10B of the heating chamber 10 by the third air deflecting plate 223. The air flow in the third exhaust flow path F3 circulates along the left inner wall 10D of the heating chamber 10, and then circulates toward the upper inner wall 10A of the heating chamber 10. At this time, the air flow in the third exhaust flow path F3 cools the left slide member 113*b* and the left slide rail 13*b*. Subsequently, as illustrated in FIG. 19, the air flow in the third exhaust flow path F3 circulates toward the plurality of exhaust hole parts 100C along the upper inner wall 10A of the heating chamber 10. At this time, the air flow in the third exhaust flow path F3 joins with the air flow in another exhaust flow path different from the third exhaust flow path F3. Subsequently, the air flow having a temperature increased through heat exchange due to cooling is emitted to the outside of the pull-out heating cooking apparatus 1 through the plurality of exhaust hole parts 100C of the panel 100.

The fourth exhaust flow path F4 is formed of the second air deflecting plate 222 and the fourth air deflecting plate 224. As illustrated in FIG. 16 to FIG. 19, in the fourth exhaust flow path F4, the air blown into the exhaust space S2 circulates toward the air supply damper 101 of the right inner wall 10C of the heating chamber 10 along the rear inner wall 10B of the heating chamber 10 by the second air deflecting plate 222 and the fourth air deflecting plate 224. At this time, the air flow in the fourth exhaust flow path F4 cools the first drive unit 153 of the first air sending unit 15. When the air supply damper 101 opens the air supply hole part 10CA of the heating chamber 10, a part of the air flow in the fourth exhaust flow path F4 is supplied into the heating chamber 10 as in-chamber intake air. Next, the air flow in the fourth exhaust flow path F4 circulates along the right inner wall 10C of the heating chamber 10, and then circulates toward the upper inner wall 10A of the heating chamber 10. At this time, the air flow in the fourth exhaust flow path F4 cools the right latch switch 52*a*, the right in-chamber light component 51*a*, and the like disposed on the right inner wall 10C side of the heating chamber 10. Subsequently, as illustrated in FIG. 19, the air flow in the fourth exhaust flow path F4 circulates toward the plurality of exhaust hole parts 100C along the upper inner wall 10A of the heating chamber 10. At this time, the air flow in the fourth exhaust flow path F4 joins with the air flow in another exhaust flow path different from the fourth exhaust flow path F4. Subsequently, the air flow having a temperature increased through heat exchange due to cooling is emitted to the outside of the pull-out heating cooking apparatus 1 through the plurality of exhaust hole parts 100C of the panel 100.

The fifth exhaust flow path F5 is formed of the third air deflecting plate 223 and the fifth air deflecting plate 225. As illustrated in FIG. 16 to FIG. 19, in the fifth exhaust flow path F5, the air blown into the exhaust space S2 circulates toward the third energization unit 172 of the grill unit 17 of the left inner wall 10D of the heating chamber 10 along the rear inner wall 10B of the heating chamber 10 by the third air deflecting plate 223 and the fifth air deflecting plate 225. Subsequently, the air flow in the fifth exhaust flow path F5 circulates along the left inner wall 10D of the heating chamber 10, and then circulates toward the upper inner wall 10A of the heating chamber 10. At this time, the air flow in the fifth exhaust flow path F5 cools the left inner wall 10D of the heating chamber 10 and the third energization unit 172 of the grill unit 17. Subsequently, as illustrated in FIG. 19, the air flow in the fifth exhaust flow path F5 circulates toward the plurality of exhaust hole parts 100C along the upper inner wall 10A of the heating chamber 10. At this time, the air flow in the fifth exhaust flow path F5 joins with the air flow in another exhaust flow path different from the fifth exhaust flow path F5. Subsequently, the air flow having a temperature increased through heat exchange due to cooling is emitted to the outside of the pull-out heating cooking apparatus 1 through the plurality of exhaust hole parts 100C of the panel 100.

The sixth exhaust flow path F6 is formed of the duct member 23. As illustrated in FIG. 18, in the sixth exhaust flow path F6, the air blown into the exhaust space S2 circulates toward the second drive unit 163 of the second air sending unit 16 of the upper inner wall 10A of the heating chamber 10 along the duct member 23. At this time, the air flow in the sixth exhaust flow path F6 is less likely to absorb heat generated by the first drive unit 153 of the first air sending unit 15. Thus, an increase in the temperature of the air blown out from the cooling fan 21 is suppressed. As a result, the second drive unit 163 of the second air sending unit 16 is cooled by the air having a lower temperature. Subsequently, as illustrated in FIG. 19, the air flow in the sixth exhaust flow path F6 circulates toward the plurality of exhaust hole parts 100C along the upper inner wall 10A of the heating chamber 10. At this time, the air flow in the sixth exhaust flow path F6 joins with the air flow in another exhaust flow path different from the sixth exhaust flow path F6. Subsequently, the air flow having a temperature increased through heat exchange due to cooling is emitted to the outside of the pull-out heating cooking apparatus 1 through the plurality of exhaust hole parts 100C of the panel 100.

Figure 20:
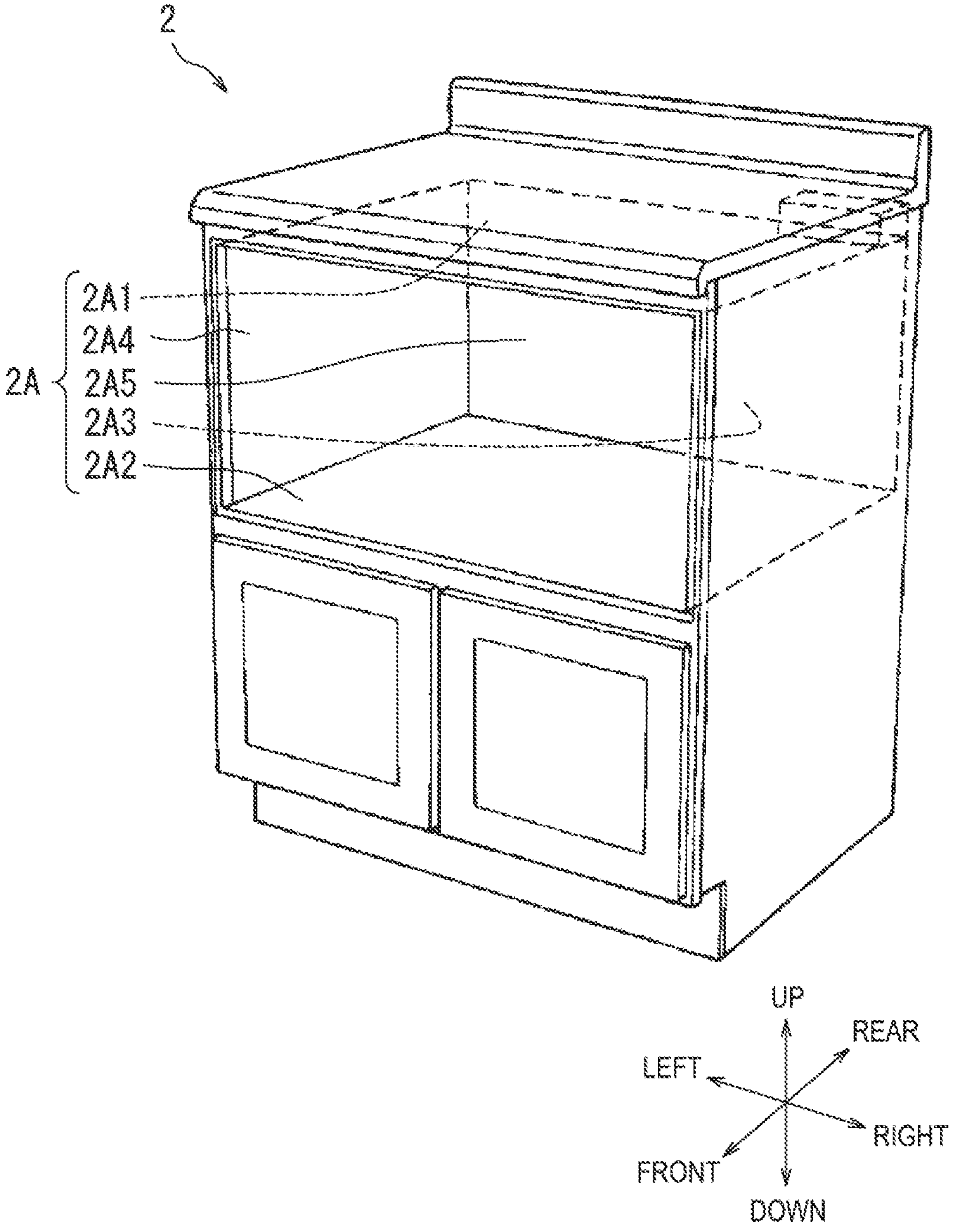

Next, a cabinet 2 in which the pull-out heating cooking apparatus 1 is built-in will be described with reference to FIG. 20. FIG. 20 is a diagram illustrating an appearance of the cabinet 2 in which the pull-out heating cooking apparatus 1 according to the first embodiment is built-in.

The pull-out heating cooking apparatus 1 is installed in the cabinet 2 (FIG. 20) in a built-in manner. As illustrated in FIG. 20, the cabinet 2 includes an upper wall 2A1, a lower wall 2A2, a right wall 2A3, a left wall 2A4, and a rear wall 2A5. Hereinafter, the upper wall 2A1, the lower wall 2A2, the right wall 2A3, the left wall 2A4, and the rear wall 2A5 may be referred to as "inner walls". The inner walls of the cabinet 2 form an accommodation portion 2A. The accommodation portion 2A is a rectangular parallelepiped space into which the pull-out heating cooking apparatus 1 is fitted.

As has been described with reference to FIG. 1 to FIG. 20, the pull-out heating cooking apparatus 1 includes the heating chamber 10, the drawer body 11, the cooling fan 21, the microwave supply unit 14, the first air sending unit 15, the second air sending unit 16, and the main body outer case 40. the heating chamber 10 includes the panel 100. The panel 100 is disposed on the front face side of the heating chamber 10. In the heating chamber 10, the air intake space S1 and the exhaust space S2 are formed between the outer surface of the heating chamber 10 and the inner surface of the main body outer case 40. The air intake space S1 guides the air taken in from the air intake hole parts 100BA to the cooling fan 21. The exhaust space S2 guides the air emitted from the cooling fan 21 to the exhaust hole parts 100C along the outer surface of the heating chamber 10. The cooling fan 21 takes in the air from the air intake hole parts 100BA to the air intake space S1, and circulates the air to the cooling fan 21 via the air intake space S1. The cooling fan 21 blows out the air to the exhaust space S2 and circulates the air to the exhaust hole parts 100C via the exhaust space S2. Owing to this configuration, the pull-out heating cooking apparatus 1 can suppress an increase in temperature around the outer surface of the heating chamber 10. As a result, the pull-out heating cooking apparatus 1 can suppress an increase in temperature of temperature regulating components disposed around the outer surface of the heating chamber 10. The temperature regulating component include the pair of left and right slide members 113, the pair of left and right slide rails 13, the first air sending unit 15, the second air sending unit 16, the grill unit 17, the pair of left and right latch switches 52, and the pair of left and right in-chamber light components 51.

As has been described with reference to FIG. 1 to FIG. 20, the pull-out heating cooking apparatus 1 further includes the partition plate 20 for partitioning the air intake space S1 and the exhaust space S2. The temperature of the air in the exhaust space S2 is higher than the temperature of the air in the air intake space S1 due to the temperature of the outer surface of the heating chamber 10. The partition plate 20 can more securely prevent the air in the air intake space S1 and the air in the exhaust space S2 from being mixed together. Owing to this configuration, the pull-out heating cooking apparatus 1 can more easily blow out low-temperature air to the exhaust space S2. As a result, the pull-out heating cooking apparatus 1 can efficiently suppress an increase in temperature of the temperature regulating components disposed around the outer surface of the heating chamber 10.

As has been described with reference to FIG. 1 to FIG. 20, the second air sending unit 16 includes the second heater 161, the second centrifugal fan 162, the second drive unit 163, and the second energization unit 164. The second drive unit 163 is located in the exhaust space S2. The second drive unit 163 becomes a high temperature when the second centrifugal fan 162 is rotated. The second energization unit 164 energizes the second heater 161 and becomes a high temperature. The pull-out heating cooking apparatus 1 can cool, by the air blown out from the cooling fan 21, the second drive unit 163 and the second energization unit 164 which have become a high temperature.

As has been described with reference to FIG. 1 to FIG. 20, the pull-out heating cooking apparatus 1 further includes the first air deflecting plate 221. The first air deflecting plate 221 functions as an air deflecting plate for the second air sending unit. The first air deflecting plate 221 can generate a flow of air toward the second air sending unit 16. The pull-out heating cooking apparatus 1 can efficiently cool the second drive unit 163 which has become a high temperature.

As has been described with reference to FIG. 1 to FIG. 20, the air sending unit includes the first air sending unit 15 and the second air sending unit 16. Thus, the pull-out heating cooking apparatus 1 can perform heating and cooking in different heating conditions of hot air. The first drive unit 153 of the first air sending unit 15 becomes a high temperature by driving of the first air sending unit 15. The second drive unit 163 of the second air sending unit 16 becomes a high temperature by driving of the second air sending unit 16. The pull-out heating cooking apparatus 1 can cool, by the air blown out from the cooling fan 21, the first drive unit 153 of the first air sending unit 15 which has become a high temperature and the second drive unit 163 of the second air sending unit 16 which has become a high temperature.

As has been described with reference to FIG. 1 to FIG. 20, the first air sending unit 15 is located on the rear inner wall 10B of the heating chamber 10. The second air sending unit 16 is located on the upper inner wall 10A of the heating chamber 10. As a result, the pull-out heating cooking apparatus 1 can cool, by the air blown out from the cooling fan 21, the first drive unit 153 of the first air sending unit 15 located on the rear inner wall 10B of the heating chamber 10 and the second drive unit 163 of the second air sending unit 16 located on the upper inner wall 10A of the heating chamber 10.

As has been described with reference to FIG. 1 to FIG. 20, the pull-out heating cooking apparatus 1 further includes the grill unit 17. The grill unit 17 includes the heating cooking heater unit 171 and the third energization unit 172. The third energization unit 172 is located in the exhaust space S2. Owing to this configuration, the pull-out heating cooking apparatus 1 can perform the heating and cooking by heat. The third energization unit 172 becomes a high temperature by driving of the grill unit 17. The pull-out heating cooking apparatus 1 can cool, by the air blown out from the cooling fan 21, the third energization unit 172 of the grill unit 17 which has become a high temperature.

As has been described with reference to FIG. 1 to FIG. 20, the pull-out heating cooking apparatus 1 further includes the third air deflecting plate 223 and the fifth air deflecting plate 225. The third air deflecting plate 223 and the fifth air deflecting plate 225 function as air deflecting plates for the grill unit. The third air deflecting plate 223 and the fifth air deflecting plate 225 can generate a flow of air toward the third energization unit 172 of the grill unit 17. Owing to this configuration, the pull-out heating cooking apparatus 1 can efficiently cool the third energization unit 172 of the grill unit 17.

As has been described with reference to FIG. 1 to FIG. 20, the third energization unit 172 is located on an upper portion of the left inner wall 10D of the heating chamber 10. The pull-out heating cooking apparatus 1 can cool, by the air blown out from the cooling fan 21, the third energization unit 172 of the grill unit 17 located on the upper portion of the left inner wall 10D of the heating chamber 10.

As has been described with reference to FIG. 1 to FIG. 20, the pull-out heating cooking apparatus 1 further includes the slide rails 13. The drawer body 11 includes the slide members 113. The slide rails 13 are located in the exhaust space S2. Owing to this configuration, the slide rails 13 and the slide members 113 become a high temperature, due to the increase in temperature in the heating cooking chamber 1A. The pull-out heating cooking apparatus 1 can cool, by the air blown out from the cooling fan 21, the slide rails 13 and the slide members 113 which have become a high temperature. As a result, durability of the slide rails 13 and the slide members 113 can be improved.

As has been described with reference to FIG. 1 to FIG. 20, the pull-out heating cooking apparatus 1 further includes the second air deflecting plate 222 and the third air deflecting plate 223. The second air deflecting plate 222 and the third air deflecting plate 223 function as air deflecting plates for the slide members. The second air deflecting plate 222 and the third air deflecting plate 223 can generate a flow of air toward the slide rails 13. Owing to this configuration, the pull-out heating cooking apparatus 1 can efficiently cool the slide rails 13 and the slide members 113 which have become a high temperature.

As has been described with reference to FIG. 1 to FIG. 20, the heating chamber 10 includes the opening part 100A. The air intake hole parts 100BA and the exhaust hole parts 100C are disposed so as to sandwich the opening part 100A. The high-temperature air emitted from the exhaust hole parts 100C is less liable to be taken in through the air intake hole parts 100BA. As a result, the pull-out heating cooking apparatus 1 can efficiently suppress an increase in temperature of peripheral components on the outer surface of the heating chamber 10.

As has been described with reference to FIG. 1 to FIG. 20, the air intake hole parts 100BA are disposed on the lower side of the opening part 100A. The exhaust hole parts 100C is disposed on the upper side of the opening part 100A. The high-temperature air more easily rises than the low-temperature air. Thus, an increase in temperature around the outer surface of the heating chamber 10 can be efficiently suppressed. Further, the pull-out heating cooking apparatus 1 can efficiently suppress an increase in temperature of the peripheral components on the outer surface of the heating chamber 10 even when there is no space for disposing the air intake hole parts 100BA and the exhaust hole parts 100C on the right side and the left side of the opening part 100A.

As has been described with reference to FIG. 1 to FIG. 20, the cooling fan 21 is located at the same height as the height of the air intake hole parts 100BA. Owing to this configuration, the cooling fan 21 can more easily take in air through the air intake hole parts 100BA as compared to when the air intake hole parts 100BA are not disposed at the same height as the cooling fan 21.

As has been described with reference to FIG. 1 to FIG. 20, the cooling fan 21 is located on the rear side of the heating chamber 10. The cooling fan 21 can blow out air from the rear side of the heating chamber 10. As a result, the air blown out from the cooling fan 21 is easily guided to a portion where cooling is desired.

As has been described with reference to FIG. 1 to FIG. 20, the cooling fan 21 includes the cross flow fan. The cross flow fan can take in air over a wide range in the left-right direction (horizontal direction) compared to a centrifugal air blower. Thus, the pull-out heating cooking apparatus 1 can efficiently take in air through the air intake hole parts 100BA, and can more efficiently cool the peripheral components on the outer surface of the heating chamber 10. The centrifugal air blower includes a sirocco fan.

As has been described with reference to FIG. 1 to FIG. 20, the pull-out heating cooking apparatus 1 further includes the duct member 23. Thus, in the exhaust space S2, the pull-out heating cooking apparatus 1 does not allow low-temperature air blown out from the cooling fan 21 to be in contact with the outer surface of the heating chamber 10, and can guide the air to the second drive unit 163 of the second air sending unit 16. As a result, the pull-out heating cooking apparatus 1 can efficiently cool the second drive unit 163 of the second air sending unit 16.

Next, a pull-out heating cooking apparatus 1 according to a second embodiment will be described. The pull-out heating cooking apparatus 1 according to the second embodiment differs from the pull-out heating cooking apparatus 1 according to the first embodiment in that it does not include the main body outer case 40.

Specifically, the pull-out heating cooking apparatus 1 according to the second embodiment includes a heating chamber 10, a drawer body 11, an operation panel 12, a pair of left and right slide rails 13, a microwave supply unit 14, a first air sending unit 15, a second air sending unit 16, a grill unit 17, a magnetron fan 18, an in-chamber exhaust duct 19, a partition plate 20, a cooling fan 21, a plurality of air deflecting plates 22, a duct member 23, a drive mechanism 30, a control unit 31, a storage unit 32, a pair of left and right in-chamber light components 51, and a pair of left and right latch switches 52.

The pull-out heating cooking apparatus 1 according to the second embodiment is installed in the cabinet 2 (FIG. 5) in a built-in manner. In a state in which the pull-out heating cooking apparatus 1 according to the second embodiment is built-in in the cabinet 2, a gap between the outer surface of the heating chamber 10 and an inner wall of the cabinet 2 functions as a duct, as will be described below.

Next, a relationship between the partition plate 20 of the pull-out heating cooking apparatus 1 and the inner wall of the cabinet 2 will be described, in the state in which the pull-out heating cooking apparatus 1 is built-in in the cabinet 2.

The partition plate 20 partitions the gap between the outer surface of the heating chamber 10 and the inner wall of the cabinet 2 into an air intake space S1 and an exhaust space S2. In the second embodiment, the air intake space S1 indicates a space closer to a lower side than the partition plate 20 of the gap between the outer surface of the heating chamber 10 and the inner wall of the cabinet 2. The exhaust space S2 indicates a space closer to an upper side than the partition plate 20 of the gap between the outer surface of the heating chamber 10 and the inner wall of the cabinet 2.

The bent portion 201*a* of the partition plate 20 is in contact with the right wall 2A3 of the cabinet 2. The bent portion 202*a* of the partition plate 20 is in contact with the right wall 2A3, the left wall 2A4, and the rear wall 2A5 of the cabinet 2. The bent portion 203*a* of the partition plate 20 is in contact with the left wall 2A4 of the cabinet 2.

Next, a relationship between the plurality of air deflecting plates 22 of the pull-out heating cooking apparatus 1 and the inner wall of the cabinet 2 will be described, in the state in which the pull-out heating cooking apparatus 1 is built-in in the cabinet 2.

The bent portion 221*al* and the bent portion 221*b*1 of the first air deflecting plate 221 are in contact with the upper wall 2A1 and the rear wall 2A5 of the cabinet 2. The bent portion 221*c*1 of the first air deflecting plate 221 is in contact with the right wall 2A3 and the rear wall 2A5 of the cabinet 2. The bent portion 221*dl* of the first air deflecting plate 221 is in contact with the left wall 2A4 and the rear wall 2A5 of the cabinet 2.

The bent portion 222*al* of the second air deflecting plate 222 is in contact with the right wall 2A3 of the cabinet 2. The bent portion 222*b*1 of the second air deflecting plate 222 is in contact with the right wall 2A3 and the rear wall 2A5 of the cabinet 2.

The bent portion 223*al* of the third air deflecting plate 223 is in contact with the left wall 2A4 of the cabinet 2. The bent portion 223*b*1 of the third air deflecting plate 223 is in contact with the left wall 2A4 and the rear wall 2A5 of the cabinet 2.

The bent portion 224*a* of the fourth air deflecting plate 224 is in contact with the upper wall 2A1 and the rear wall 2A5 of the cabinet 2. The bent portion 224*b* of the fourth air deflecting plate 224 is in contact with the right wall 2A3 of the cabinet 2.

The bent portion 225*a* of the fifth air deflecting plate 225 is in contact with the upper wall 2A1 and the rear wall 2A5 of the cabinet 2.

The bent portion 231*a* of the duct member 23 is in contact with the upper wall 2A1 and the rear wall 2A5 of the cabinet 2. The bent portion 232*a* of the duct member 23 is in contact with the upper wall 2A1 of the cabinet 2.

In the second embodiment, the duct member 23 functions as the duct when the pull-out heating cooking apparatus 1 according to the second embodiment is built-in in the cabinet 2. In other words, the duct member 23 does not allow the air blown out from the cooling fan 21 to be in contact with the outer surface of the heating chamber 10, and guides the air to the second drive unit 163 of the second air sending unit 16.

As described above, similar to the pull-out heating cooking apparatus 1 according to the first embodiment, the pull-out heating cooking apparatus 1 according to the second embodiment can suppress the increase in temperature around the outer surface of the heating chamber 10 when the pull-out heating cooking apparatus 1 according to the second embodiment is built-in in the cabinet 2.

In the above, the embodiments of the present invention have been described with reference to the drawings (FIG. 1 to FIG. 20). Note that the present invention is not limited to the embodiments described above, and can be carried out in the form of various aspects within the scope not departing from the gist of the present invention (for example, (1) to (18) described below). The drawings primarily schematically illustrate each of the constituent elements for the sake of easier understanding, and the thickness, length, quantity, and the like of each of the illustrated constituent elements are different from the actual thickness, length, quantity, and the like by reason of creation of the drawings. The material, shape, dimensions, and the like of each of the constituent elements illustrated in the embodiment described above are merely exemplary and are not particularly limiting, and various modifications can be made within the scope not departing from the effects of the present invention in essence.

(1) As has been described with reference to FIG. 1 to FIG. 20, in the first embodiment and the second embodiment, when the main body outer case 40 is attached to the pull-out heating cooking apparatus 1, the first air sending unit 15 and the second air sending unit 16 are disposed so as to be located in the exhaust space S2 but the present invention is not limited thereto. For example, when the main body outer case 40 is attached to the pull-out heating cooking apparatus 1, at least one of the first air sending unit 15 and the second air sending unit 16 may be disposed so as to be located in the air intake space S1.

(2) As has been described with reference to FIG. 1 to FIG. 20, in the first embodiment and the second embodiment, the pull-out heating cooking apparatus 1 includes the partition plate 20. However, the present invention is not limited to this. The pull-out heating cooking apparatus 1 need not include the partition plate 20. In this case, when the main body outer case 40 is attached to the pull-out heating cooking apparatus 1, a portion of the outer surface of the heating chamber 10 and the inner surface of the main body outer case 40 may come into contact with each other to form the air intake space S1 and the exhaust space S2.

(3) As has been described with reference to FIG. 1 to FIG. 20, in the first embodiment and the second embodiment, the first drive unit 153 of the first air sending unit 15 and the second drive unit 163 of the second air sending unit 16 are located in the exhaust space S2. However, the present invention is not limited to this. In the pull-out heating cooking apparatus 1, the first drive unit 153 of the first air sending unit 15 and the second drive unit 163 of the second air sending unit 16 need not be located in the exhaust space S2.

(4) As has been described with reference to FIG. 1 to FIG. 20, in the first embodiment and the second embodiment, the pull-out heating cooking apparatus 1 includes the first air deflecting plate 221. However, the present invention is not limited to this. The first air deflecting plate 221 functions as an air deflecting plate for the second air sending unit. The pull-out heating cooking apparatus 1 need not include the first air deflecting plate 221. For example, the pull-out heating cooking apparatus 1 may include an air deflecting plate for preventing the air blown out from the cooling fan 21 from circulating to the second drive unit 163 of the second air sending unit 16.

(5) As has been described with reference to FIG. 1 to FIG. 20, in the first embodiment and the second embodiment, the pull-out heating cooking apparatus 1 includes the first air sending unit 15 and the second air sending unit 16. However, the present invention is not limited to this. For example, the pull-out heating cooking apparatus 1 may include only one of the first air sending unit 15 and the second air sending unit 16, or may further include another air sending unit other than the first air sending unit 15 and the second air sending unit 16.

(6) As has been described with reference to FIG. 1 to FIG. 20, in the first embodiment and the second embodiment, the first air sending unit 15 is located on the rear inner wall 10B of the heating chamber 10, and the second air sending unit 16 is located on the upper inner wall 10A of the heating chamber 10. However, the present invention is not limited to this. For example, the first air sending unit 15 may be located on the right inner wall 10C of the heating chamber 10, or the second air sending unit 16 may be located on the left inner wall 10D of the heating chamber 10.

(7) As has been described with reference to FIG. 1 to FIG. 20, in the first embodiment and the second embodiment, the pull-out heating cooking apparatus 1 includes the grill unit 17. However, the present invention is not limited to this. The pull-out heating cooking apparatus 1 need not include the grill unit 17.

(8) As has been described with reference to FIG. 1 to FIG. 20, in the first embodiment and the second embodiment, the pull-out heating cooking apparatus 1 includes the third air deflecting plate 223 and the fifth air deflecting plate 225. However, the present invention is not limited to this. The third air deflecting plate 223 and the fifth air deflecting plate 225 function as air deflecting plates for the grill unit. The pull-out heating cooking apparatus 1 need not include the third air deflecting plate 223 and the fifth air deflecting plate 225. For example, the pull-out heating cooking apparatus 1 may include an air deflecting plate for preventing the air blown out from the cooling fan 21 from circulating to the third energization unit 172 of the grill unit 17.

(9) As has been described with reference to FIG. 1 to FIG. 20, in the first embodiment and the second embodiment, the third energization unit 172 of the grill unit 17 is located in the exhaust space S2. However, the present invention is not limited to this. The third energization unit 172 of the grill unit 17 need not be located in the exhaust space S2.

(10) As has been described with reference to FIG. 1 to FIG. 20, in the first embodiment and the second embodiment, the slide rails 13, the right slide rail 13*a*, and the left slide rail 13*b* are located in the exhaust space S2. However, the present invention is not limited to this. The slide rails 13, the right slide rail 13*a*, and the left slide rail 13*b* need not be located in the exhaust space S2.

(11) As has been described with reference to FIG. 1 to FIG. 20, in the first embodiment and the second embodiment, the pull-out heating cooking apparatus 1 includes the second air deflecting plate 222 and the third air deflecting plate 223. However, the present invention is not limited to this. The second air deflecting plate 222 and the third air deflecting plate 223 function as air deflecting plates for the slide members. The pull-out heating cooking apparatus 1 need not include the second air deflecting plate 222 and the third air deflecting plate 223. For example, the pull-out heating cooking apparatus 1 may include an air deflecting plate for preventing the air blown out from the cooling fan 21 from circulating to the slide rails 13.

(12) As has been described with reference to FIG. 1 to FIG. 20, in the first embodiment and the second embodiment, the air intake hole parts 100BA and the exhaust hole parts 100C are disposed so as to sandwich the opening part 100A. However, the present invention is not limited to this. For example, the air intake hole parts 100BA and the exhaust hole parts 100C may be disposed on the upper side or the lower side of the opening part 100A.

(13) As has been described with reference to FIG. 1 to FIG. 20, in the first embodiment and the second embodiment, the air intake hole parts 100BA are disposed on the lower side of the opening part 100A and the exhaust hole parts 100C are disposed on the upper side of the opening part 100A. However, the present invention is not limited to this. For example, the air intake hole parts 100BA may be disposed on the upper side of the opening part 100A, and the exhaust hole parts 100C may be disposed on the lower side of the opening part 100A. Further, the air intake hole parts 100BA may be disposed on the left side of the opening part 100A, and the exhaust hole parts 100C may be disposed on the right side of the opening part 100A.

(14) As has been described with reference to FIG. 1 to FIG. 20, in the first embodiment and the second embodiment, the cooling fan 21 is located at the same height as the height of the air intake hole parts 100BA. However, the present invention is not limited to this. The cooling fan 21 need not be located at the same height as the height of the air intake hole parts 100BA.

(15) As has been described with reference to FIG. 1 to FIG. 20, in the first embodiment and the second embodiment, the cooling fan 21 is located on the rear side of the heating chamber 10. However, the present invention is not limited to this. The cooling fan 21 need not be located on the rear side of the heating chamber 10.

(16) As has been described with reference to FIG. 1 to FIG. 20, in the first embodiment and the second embodiment, the cross flow fan is used as the cooling fan 21. However, the present invention is not limited to this. For example, as the cooling fan 21, the centrifugal fan may be used, or a compressor may be used. Further, in the present embodiment, as the cooling fan 21, two cross flow fans are used. However, the present invention is not limited to this. For example, as the cooling fan 21, only one cross flow fan may be used, or three or more cross flow fans may be used.

(17) As has been described with reference to FIG. 1 to FIG. 20, in the first embodiment and the second embodiment, the pull-out heating cooking apparatus 1 includes the duct member 23. However, the present invention is not limited to this. The pull-out heating cooking apparatus 1 need not include the duct member 23.

(18) As has been described with reference to FIG. 1 to FIG. 20, in the first embodiment and the second embodiment, the cooling fan 21 is disposed on the rear side of the heating chamber 10 and on the lower side of the heating chamber 10. However, the present invention is not limited to this. For example, the cooling fan 21 may be disposed on the rear side of the heating chamber 10 and on the upper side of the heating chamber 10. In this case, the shape of the partition plate 20 may be adjusted in order to form the air intake space S1.

INDUSTRIAL APPLICABILITY

The present invention is useful in the field of a pull-out heating cooking apparatus, for example.

REFERENCE SIGNS LIST

1 Pull-out heating cooking apparatus
1A Heating cooking chamber
2 Cabinet
10 Heating chamber
11 Drawer body
14 Microwave supply unit
15 Air sending unit
21 Fan
40 Main body outer case
100 Panel
100B First through hole part
100C Second through hole part
S1 First space
S2 Second space

The invention claimed is:

1. A pull-out heating cooking apparatus comprising:

a heating chamber including a heating cooking chamber formed therein;

a drawer body accommodated in the heating cooking chamber and being capable of being drawn out;

a cooling fan;

a microwave supply unit configured to supply microwave into the heating cooking chamber, and including a magnetron;

an air sending unit configured to supply hot air into the heating cooking chamber;

a main body outer case configured to accommodate the heating chamber, the cooling fan, the microwave supply unit, and the air sending unit;

a partition plate configured to partition a first space and a second space between an outer surface of the heating chamber and an inner surface of the main body outer case;

a slide member attached to an outer side surface of the heating chamber and extending in a front-rear direction, the slide member being located in the second space; and a first air deflecting plate for the slide member configured to guide air blown out from the cooling fan toward the slide member, and being located in the second space, wherein:

the heating chamber further includes a panel provided with a first through hole part and a second through hole part, the panel is disposed on a front face side of the heating chamber, the first space is configured to guide air taken from the first through hole part toward the cooling fan, the second space is configured to guide the air blown from the cooling fan toward the second through hole part along the outer surface of the heating chamber, the cooling fan is configured to take in the air from the first through hole part toward the first space and circulate the air toward the cooling fan via the first space, and the cooling fan is further configured to blow out the air toward the second space and circulate the air toward the second through hole part via the second space, the air sending unit includes:

a heater configured to heat air, a centrifugal fan configured to blow the air heated by the heater to the heating cooking chamber to generate the hot air, and a drive unit, that is a motor, configured to drive the centrifugal fan, the slide member is located, in the second space, above the partition plate and below the first air deflecting plate, each of the slide member, the partition plate, and the first air deflecting plate extends along a first direction, the first direction being a direction intersecting an up-down direction, an airflow passage extending along the first direction is defined between the first air deflecting plate and the partition plate along an outer surface of the slide member, and one end of the first air deflecting plate is positioned, in the up-down direction, above the cooling fan and the partition plate and below the drive unit.

2. The pull-out heating cooking apparatus according to claim 1, further comprising:

a second air deflecting plate for the air sending unit configured to guide the air blown out from the cooling fan toward the drive unit.

3. The pull-out heating cooking apparatus according to claim 1, wherein the air sending unit further includes a first air sending unit and a second air sending unit.

4. The pull-out heating cooking apparatus according to claim 3, wherein the outer surface of the heating chamber includes an upper surface and a rear surface, the first air sending unit is located on the rear surface of the heating chamber, and the second air sending unit is located on the upper surface of the heating chamber.

5. The pull-out heating cooking apparatus according to claim 1, wherein the drawer body includes a slide rail supported by the slide member, and the slide rail slides along the slide member, while the drawer body moves in the front-rear direction.

6. The pull-out heating cooking apparatus according to claim 1, wherein the heating chamber further includes an opening part through which the drawer body passes when the drawer body is drawn out from the heating cooking chamber, and the opening part is disposed between the first through hole part and the second through hole part.

7. The pull-out heating cooking apparatus according to claim 6, wherein the first through hole part is disposed on a lower side of the opening part, and the second through hole part is disposed on an upper side of the opening part.

8. The pull-out heating cooking apparatus according to claim 1, wherein the cooling fan is located at a same height as a height of the first through hole part.

9. The pull-out heating cooking apparatus according to claim 1, wherein the cooling fan is located on a rear side of the heating chamber.

10. The pull-out heating cooking apparatus according to claim 1, wherein the cooling fan includes a cross flow fan.

11. The pull-out heating cooking apparatus according to claim 1, further comprising:

a duct member configured to guide the air blown out from the cooling fan toward the air sending unit along a path away from the outer surface of the heating chamber.

12. A pull-out heating cooking apparatus comprising:

a heating chamber including a heating cooking chamber formed therein;

a drawer body accommodated in the heating cooking chamber and being capable of being drawn out;

a cooling fan;

a microwave supply unit configured to supply microwave into the heating cooking chamber, and including a magnetron;

an air sending unit configured to supply hot air into the heating cooking chamber;

a main body outer case configured to accommodate the heating chamber, the cooling fan, the microwave supply unit, and the air sending unit;

a partition plate configured to partition a first space and a second space between an outer surface of the heating chamber and an inner surface of the main body outer case;

a slide member attached to an outer side surface of the heating chamber and extending in a front-rear direction, the slide member being located in the second space; and a first air deflecting plate for the slide member configured to guide air blown out from the cooling fan toward the slide member, and being located in the second space, wherein:

the heating chamber further includes a panel provided with a first through hole part and a second through hole part, the panel is disposed on a front face side of the heating chamber, the first space is configured to guide air taken from the first through hole part toward the cooling fan, the second space is configured to guide the air blown from the cooling fan toward the second through hole part along the outer surface of the heating chamber, the cooling fan is configured to take in the air from the first through hole part toward the first space and circulate the air toward the cooling fan via the first space, and the cooling fan is further configured to blow out the air toward the second space and circulate the air toward the second through hole part via the second space, the air sending unit includes:

a heater configured to heat air, a centrifugal fan configured to blow the air heated by the heater to the heating cooking chamber to generate the hot air, and a drive unit, that is a motor, configured to drive the centrifugal fan, the slide member is located, in the second space, above the partition plate and below the first air deflecting plate, the drive unit is located in the second space, the cooling fan blows air upward into the second space, and one end of the first air deflecting plate is positioned, in an up-down direction, above the cooling fan and the partition plate and below the drive unit.

* * * * *